(12) United States Patent
Sugahara et al.

(10) Patent No.: US 7,174,030 B2
(45) Date of Patent: Feb. 6, 2007

(54) METHOD AND APPARATUS FOR EMBEDDING AND REPRODUCING WATERMARK INTO AND FROM CONTENTS DATA

(75) Inventors: Takayuki Sugahara, Yokosuka (JP); Masayoshi Nishitani, Yokosuka (JP)

(73) Assignee: Victor Company of Japan, Ltd., Yokohama (JP)

( * ) Notice: Subject to any disclaimer, the term of this patent is extended or adjusted under 35 U.S.C. 154(b) by 776 days.

(21) Appl. No.: 10/029,672

(22) Filed: Dec. 31, 2001

(65) Prior Publication Data

US 2002/0105839 A1   Aug. 8, 2002

(30) Foreign Application Priority Data

| Feb. 6, 2001 | (JP) | ............................. 2001-028928 |
| Feb. 14, 2001 | (JP) | ............................. 2001-037168 |
| Feb. 27, 2001 | (JP) | ............................. 2001-052221 |

(51) Int. Cl.
   *G06K 9/00*   (2006.01)
(52) U.S. Cl. .................................................... 382/100
(58) Field of Classification Search ................ 382/100
   See application file for complete search history.

(56) References Cited

U.S. PATENT DOCUMENTS

| 6,044,182 | A | * | 3/2000 | Daly et al. ................... 382/284 |
| 6,055,321 | A | * | 4/2000 | Numao et al. ............... 382/100 |
| 6,122,403 | A | * | 9/2000 | Rhoads ........................ 382/233 |
| 6,823,455 | B1 | * | 11/2004 | Macy et al. ................. 713/176 |
| 2002/0099943 | A1 | * | 7/2002 | Rodriguez et al. .......... 713/176 |

OTHER PUBLICATIONS

"A copyright Information Embedding Method using DCT for Digital Movies" by Ogawa et al.; The 1997 Symposium on Cryptograpy and Informasion Security (SCIS'97-31G); Jan. 29-Feb. 1, 1997; pp. 1-4.
"A Watermarking scheme to image data by PN sequence" by Ohnishi et al.; The 1997 Symposium on Cryptography and Information Security (SCIS'97); Jan. 29-Feb. 1, 2001; pp. 1-8.
McGraw-Hill Concise Encyclopedia of Science & Technology, 4th edition, published 1998.

* cited by examiner

*Primary Examiner*—Bhavesh M. Mehta
*Assistant Examiner*—Patrick Edwards
(74) *Attorney, Agent, or Firm*—Louis Woo

(57) ABSTRACT

An apparatus for embedding a watermark into contents data includes a pattern generating device for generating bits representing a predetermined bit pattern corresponding to a watermark. A specified-bit detecting device operates for detecting bits in original picture data as specified bits into which a watermark can be embedded. A calculating device operates for calculating a desired bit pattern represented by the specified bits in response to the predetermined bit pattern and a specified bit pattern. The desired bit pattern can be converted into the specified bit pattern by given logical operation with the predetermined bit pattern. A mixing device operates for changing the specified bits to represent the desired bit pattern to convert the original picture data into watermark-embedded picture data.

8 Claims, 13 Drawing Sheets

| 1 | 0 | 1 |
|---|---|---|
| 0 | 1 | 0 |
| 1 | 0 | 1 |

| 0 | 1 | 0 |
|---|---|---|
| 1 | 0 | 1 |
| 0 | 1 | 0 |

METHOD AND APPARATUS FOR EMBEDDING AND REPRODUCING WATERMARK INTO AND FROM CONTENTS DATA

BACKGROUND OF THE INVENTION

1. Field of the Invention

This invention relates to a method and an apparatus for embedding or inserting a watermark into contents data such as picture data, audio data, audio visual data, or multimedia data. In addition, this invention relates to a method and an apparatus for reproducing or extracting a watermark from watermarked contents data.

2. Description of the Related Art

H. Ogawa et al. have reported "A Copying Information Embedding Method using DCT for Digital Movies", SCIS'97-31G, which discloses watermarking methods suitable for MPEG bit streams. The watermarking methods are based on modifying DCT coefficients, motion vectors, and quantizer matrices. Regarding contents data into which watermark information have been inserted by the DCT-coefficient-modifying watermarking method reported by H. Ogawa et al., the accuracy of reproducing the watermark information from the contents data is considerably low when the synchronization with DCT-sampling units (DCT blocks) fails to be acquired. The failure of the acquisition of the synchronization causes DCT blocks to shift from true positions by, for example, one pixel or one line in a frame. It is assumed that picture data which have been watermarked by one of the methods reported by H. Ogawa et al. are subjected to affine transformation to slightly rotate or distort a picture. It tends to be difficult to accurately extract the watermark from the transformation-resultant watermarked picture data.

J. Ohnishi et al. have reported "A Watermarking Scheme to Image Data by PN Sequence", SCIS'97-26B, which discloses a data hiding method using a PN sequence in the spread spectrum technique. In the data hiding method, an original image signal is converted into a spread spectrum in response to a PN sequence. A narrow band signal to stand for a signature is added to the spread spectrum, that is, a wideband channel of which an original image is spread. When the signature-added spread spectrum is inversely converted into the normal image by the PN sequence, the signature signal is spread over the normal-image signal. In other words, the signature signal is embedded in the normal-image signal. The spread signature signal is low in power, and hence hardly acts as noise with respect to the original image. Accordingly, the signature-added image is substantially the same as the original image. When the signature-added image signal is spread by the PN sequence, the signature signal is reproduced.

SUMMARY OF THE INVENTION

It is a first object of this invention to provide an improved apparatus for embedding or inserting a watermark into contents data.

It is a second object of this invention to provide an improved method of embedding or inserting a watermark into contents data.

It is a third object of this invention to provide an improved apparatus for reproducing or extracting a watermark from watermarked contents data.

It is a fourth object of this invention to provide an improved method of reproducing or extracting a watermark from watermarked contents data.

A first aspect of this invention provides an apparatus for embedding a watermark into contents data. The apparatus comprises pattern generating means for generating bits representing a predetermined bit pattern corresponding to a watermark; specified-bit detecting means for detecting bits in original picture data as specified bits into which a watermark can be embedded; calculating means for calculating a desired bit pattern represented by the specified bits in response to the predetermined bit pattern and a specified bit pattern, wherein the desired bit pattern can be converted into the specified bit pattern by given logical operation with the predetermined bit pattern; and mixing means for changing the specified bits to represent the desired bit pattern to convert the original picture data into watermark-embedded picture data.

A second aspect of this invention is based on the first aspect thereof, and provides an apparatus wherein the predetermined bit pattern and the specified bit pattern remain unchanged when being rotated through one of 90, 180, and 270 degrees.

A third aspect of this invention provides a method of embedding a watermark into contents data. The method comprises the steps of generating bits representing a predetermined bit pattern corresponding to a watermark; detecting bits in original picture data as specified bits into which a watermark can be embedded; calculating a desired bit pattern represented by the specified bits in response to the predetermined bit pattern and a specified bit pattern, wherein the desired bit pattern can be converted into the specified bit pattern by given logical operation with the predetermined bit pattern; and changing the specified bits to represent the desired bit pattern to convert the original picture data into watermark-embedded picture data.

A fourth aspect of this invention is based on the third aspect thereof, and provides a method wherein the predetermined bit pattern and the specified bit pattern remain unchanged when being rotated through one of 90, 180, and 270 degrees.

A fifth aspect of this invention provides an apparatus for reproducing a watermark from watermarked contents data. The apparatus comprises pattern generating means for generating bits representing a predetermined bit pattern; operation means for selecting specified bits among bits in watermark-added picture data, for repetitively changing the currently-selected specified bits from ones to others, and for executing given logical operation between the predetermined bit pattern and a bit pattern represented by the currently-selected specified bits; embedding-position detecting means for deciding whether or not a result of the given logical operation is equal to a specified bit pattern, and for, when the result of the given logical operation is equal to the specified bit pattern, deciding that the currently-selected specified bits correspond to a watermark-embedded region; and converting means for changing one of a luminance and a color hue represented by a portion of the watermark-added picture data which corresponds to one of the watermark-embedded region and a region adjoining the watermark-embedded region.

A sixth aspect of this invention is based on the fifth aspect thereof, and provides an apparatus wherein the predetermined bit pattern and the specified bit pattern remain unchanged when being rotated through one of 90, 180, and 270 degrees.

A seventh aspect of this invention provides a method of reproducing a watermark from watermarked contents data. The method comprises the steps of generating bits representing a predetermined bit pattern; selecting specified bits among bits in watermark-added picture data; repetitively changing the currently-selected specified bits from ones to others; executing given logical operation between the predetermined bit pattern and a bit pattern represented by the currently-selected specified bits; deciding whether or not a result of the given logical operation is equal to a specified bit pattern; when it is decided that the result of the given logical operation is equal to the specified bit pattern, deciding that the currently-selected specified bits correspond to a watermark-embedded region; and changing one of a luminance and a color hue represented by a portion of the watermark-added picture data which corresponds to one of the watermark-embedded region and a region adjoining the watermark-embedded region.

An eighth aspect of this invention is based on the seventh aspect thereof, and provides a method wherein the predetermined bit pattern and the specified bit pattern remain unchanged when being rotated through one of 90, 180, and 270 degrees.

A ninth aspect of this invention provides an apparatus for embedding a watermark into contents data. The apparatus comprises pattern generating means for generating bits representing a fixed bit pattern; embedding-position deciding means for deciding a watermark-embedding position with respect to original picture data; random-number generating means for generating random-number data representing a random number; calculating means for calculating a desired bit pattern represented by specified bits in response to the fixed bit pattern and a specified bit pattern, the specified bits being among bits in a first portion of the original picture data which corresponds to the watermark-embedding position, wherein the desired bit pattern can be converted into the specified bit pattern by given logical operation with the fixed bit pattern; operation means for executing given logical operation between watermark data and the random-number data; and mixing means for changing the specified bits to represent the desired bit pattern, and for embedding a result of the given logical operation in a second portion of the original picture data which corresponds to the watermark-embedding position and which adjoins the first portion of the original picture data.

A tenth aspect of this invention is based on the ninth aspect thereof, and provides an apparatus wherein the watermark-embedding position is composed of sub positions dispersing in a frame.

An eleventh aspect of this invention is based on the ninth aspect thereof, and provides an apparatus wherein the embedding-position deciding means comprises means for dividing the original picture data into equal-size blocks, means for calculating a degree of a complexity of a picture portion represented by each of the equal-size blocks, means for selecting ones among the equal-size blocks which correspond to calculated complexity degrees equal to or greater than a prescribed value, and means for deciding the watermark-embedding position in response to the selected ones of the equal-size blocks.

A twelfth aspect of this invention provides a method of embedding a watermark into contents data. The method comprises the steps of generating bits representing a fixed bit pattern; deciding a watermark-embedding position with respect to original picture data; generating random-number data representing a random number; calculating a desired bit pattern represented by specified bits in response to the fixed bit pattern and a specified bit pattern, the specified bits being among bits in a first portion of the original picture data which corresponds to the watermark-embedding position, wherein the desired bit pattern can be converted into the specified bit pattern by given logical operation with the fixed bit pattern; executing given logical operation between watermark data and the random-number data; and changing the specified bits to represent the desired bit pattern, and embedding a result of the given logical operation in a second portion of the original picture data which corresponds to the watermark-embedding position and which adjoins the first portion of the original picture data.

A thirteenth aspect of this invention provides an apparatus for reproducing a watermark from watermarked contents data. The apparatus comprises pattern generating means for generating bits representing a fixed bit pattern; random-number generating means for generating random-number data representing a random number; first operation means for selecting specified bits among bits in watermark-added picture data, for repetitively changing the currently-selected specified bits from ones to others, and for executing given logical operation between the fixed bit pattern and a bit pattern represented by the currently-selected specified bits; embedding-position detecting means for deciding whether or not a result of the given logical operation by the first operation means is equal to a specified bit pattern, and for, when the result of the given logical operation by the first operation means is equal to the specified bit pattern, deciding that the currently-selected specified bits correspond to a first part of a watermark-embedded position; and second operation means for executing given logical operation between the random-number data and a portion of the watermark added picture data which corresponds to a second part of the watermark-embedded position different from the first part thereof to reproduce watermark data from the watermark-added picture data.

A fourteenth aspect of this invention provides a method of reproducing a watermark from watermarked contents data. The method comprises the steps of generating bits representing a fixed bit pattern; generating random-number data representing a random number; selecting specified bits among bits in watermark-added picture data; repetitively changing the currently-selected specified bits from ones to others; executing given logical operation between the fixed bit pattern and a bit pattern represented by the currently-selected specified bits; deciding whether or not a result of the given logical operation is equal to a specified bit pattern; when the result of the given logical operation is equal to the specified bit pattern, deciding that the currently-selected specified bits correspond to a first part of a watermark-embedded position; and executing given logical operation between the random-number data and a portion of the watermark-added picture data which corresponds to a second part of the watermark-embedded position different from the first part thereof to reproduce watermark data from the watermark-added picture data.

A fifteenth aspect of this invention provides an apparatus for embedding a watermark into contents data. The apparatus comprises pattern generating means for generating bits representing a fixed two-dimensional bit pattern; embedding-position deciding means for deciding a two-dimensional watermark-embedding region with respect to original picture data; random-number generating means for generating random-number data representing a random number; calculating means for calculating a desired two-dimensional bit pattern represented by specified bits in response to the fixed two-dimensional bit pattern and a specified two-dimensional bit pattern, the specified bits being among bits in a first portion of the original picture data which corresponds to a first part of the two-dimensional watermark-embedding region, wherein the desired two-dimensional bit pattern can be converted into the specified two-dimensional bit pattern by given logical operation with the fixed two-dimensional bit pattern; operation means for executing given logical operation between watermark data and the random-number data; and mixing means for changing the specified bits to represent the desired two-dimensional bit pattern, and for embedding a result of the given logical operation in a second portion of the original picture data which corresponds to a second part of the two-dimensional watermark-embedding region different from the first part thereof.

A sixteenth aspect of this invention is based on the fifteenth aspect thereof, and provides an apparatus wherein the first part of the two-dimensional watermark-embedding region is a central part thereof, and the second part of the two-dimensional watermark-embedding region is an outer part thereof which surrounds the central part thereof.

A seventeenth aspect of this invention is based on the fifteenth aspect thereof, and provides an apparatus wherein the two-dimensional watermark-embedding region corresponds to a portion of the original picture data which represents one of (1) a picture portion having a degree of a complexity equal to or greater than a prescribed value and (2) a picture portion including a contour.

An eighteenth aspect of this invention is based on the fifteenth aspect thereof, and provides an apparatus wherein the fixed two-dimensional bit pattern and the specified two-dimensional bit pattern remain unchanged when being rotated through one of 90, 180, and 270 degrees.

A nineteenth aspect of this invention provides a method of embedding a watermark into contents data. The method comprises the steps of generating bits representing a fixed two-dimensional bit pattern; deciding a two-dimensional watermark-embedding region with respect to original picture data; generating random-number data representing a random number; calculating a desired two-dimensional bit pattern represented by specified bits in response to the fixed two-dimensional bit pattern and a specified two-dimensional bit pattern, the specified bits being among bits in a first portion of the original picture data which corresponds to a first part of the two-dimensional watermark-embedding region, wherein the desired two-dimensional bit pattern can be converted into the specified two-dimensional bit pattern by given logical operation with the fixed two-dimensional bit pattern; executing given logical operation between watermark data and the random-number data; and changing the specified bits to represent the desired two-dimensional bit pattern, and embedding a result of the given logical operation in a second portion of the original picture data which corresponds to a second part of the two-dimensional watermark-embedding region different from the first part thereof.

A twentieth aspect of this invention is based on the nineteenth aspect thereof, and provides a method wherein the fixed two-dimensional bit pattern and the specified two-dimensional bit pattern remain unchanged when being rotated through one of 90, 180, and 270 degrees.

A twenty-first aspect of this invention provides an apparatus for reproducing a watermark from watermarked contents data. The apparatus comprises pattern generating means for generating bits representing a fixed two-dimensional bit pattern; random-number generating means for generating random-number data representing a random number; first operation means for selecting specified bits among bits in watermark-added picture data, for repetitively changing the currently-selected specified bits from ones to others, and for executing given logical operation between the fixed two-dimensional bit pattern and a two-dimensional bit pattern represented by the currently-selected specified bits; embedding-position detecting means for deciding whether or not a result of the given logical operation by the first operation means is equal to a specified two-dimensional bit pattern, and for, when the result of the given logical operation by the first operation means is equal to the specified two-dimensional bit pattern, deciding that the currently-selected specified bits correspond to a two-dimensional watermark-embedded region; and second operation means for executing given logical operation between the random-number data and a portion of the watermark-added picture data which corresponds to the two-dimensional watermark-embedded region to reproduce watermark data from the watermark-added picture data.

A twenty-second aspect of this invention is based on the twenty-first aspect thereof, and provides an apparatus wherein the embedding-position detecting means comprises means for, when the result of the given logical operation by the first operation means is equal to the specified two-dimensional bit pattern, deciding that the currently-selected specified bits correspond to a first part of the two-dimensional watermark-embedded region, and the second operation means comprises means for executing given logical operation between the random-number data and a portion of the watermark-added picture data which corresponds to a second part of the two-dimensional watermark-embedded region different from the first part thereof to reproduce watermark data from the watermark-added picture data.

A twenty-third aspect of this invention is based on the twenty-first aspect thereof, and provides an apparatus wherein the fixed two-dimensional bit pattern and the specified two-dimensional bit pattern remain unchanged when being rotated through one of 90, 180, and 270 degrees.

A twenty-fourth aspect of this invention provides a method of reproducing a watermark from watermarked contents data. The method comprises the steps of generating bits representing a fixed two-dimensional bit pattern; generating random-number data representing a random number; selecting specified bits among bits in watermark-added picture data; repetitively changing the currently-selected specified bits from ones to others; executing given logical operation between the fixed two-dimensional bit pattern and a two-dimensional bit pattern represented by the currently-selected specified bits; deciding whether or not a result of the given logical operation is equal to a specified two-dimensional bit pattern; when the result of the given logical operation is equal to the specified two-dimensional bit pattern, deciding that the currently-selected specified bits correspond to a two-dimensional watermark-embedded region; and executing given logical operation between the random-number data and a portion of the watermark-added picture data which corresponds to the two-dimensional watermark-embedded region to reproduce watermark data from the watermark-added picture data.

A twenty-fifth aspect of this invention is based on the twenty-fourth aspect thereof, and provides a method wherein the fixed two-dimensional bit pattern and the specified two-dimensional bit pattern remain unchanged when being rotated through one of 90, 180, and 270 degrees.

DETAILED DESCRIPTION OF THE INVENTION

First Embodiment

Figure 1:
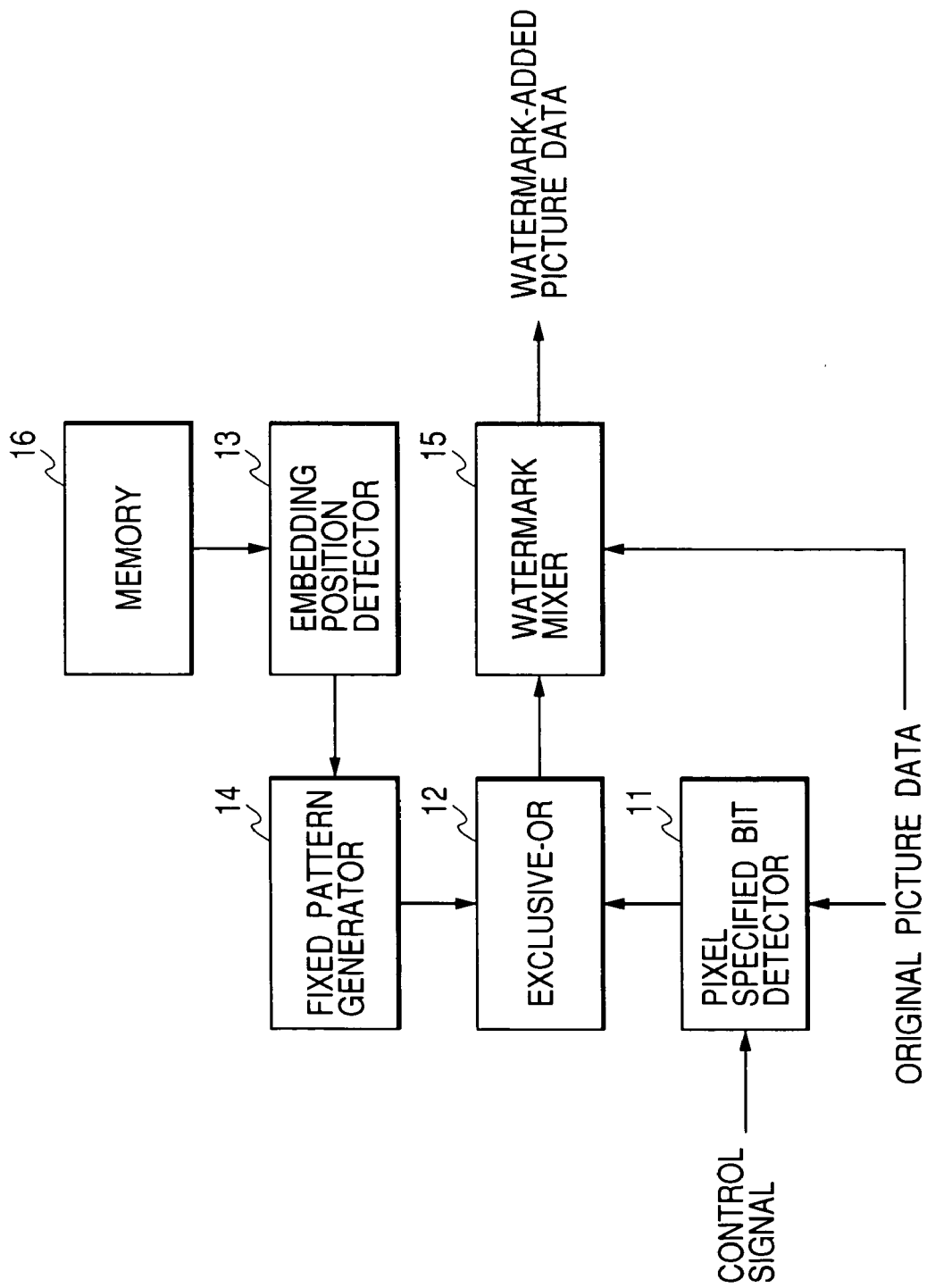
FIG. 1 is a block diagram of an apparatus for embedding or inserting a watermark into contents data according to a first embodiment of this invention.

FIG. 1 shows an apparatus for embedding or inserting a watermark into contents data according to a first embodiment of this invention. The apparatus of FIG. 1 includes a pixel specified-bit detector 11, an exclusive-OR device 12, an embedding-position detector (an embedding-position deciding device) 13, a fixed pattern generator 14, a watermark mixer 15, and a memory 16. The pixel specified-bit detector 11 is connected to a first input terminal of the exclusive-OR device 12. The embedding-position detector 13 is connected to the fixed-pattern generator 14 and the memory 16. The fixed-pattern generator 14 is connected to a second input terminal of the exclusive-OR device 12. The output terminal of the exclusive-OR device 12 is connected to a first input terminal of the watermark mixer 15.

Contents data representing an original picture or a sequence of original pictures are fed to the pixel specified-bit detector 11 and a second input terminal of the watermark mixer 15. The original picture data (the contents data) are composed of a luminance signal Y and color difference signals Cb and Cr.

Figure 2:
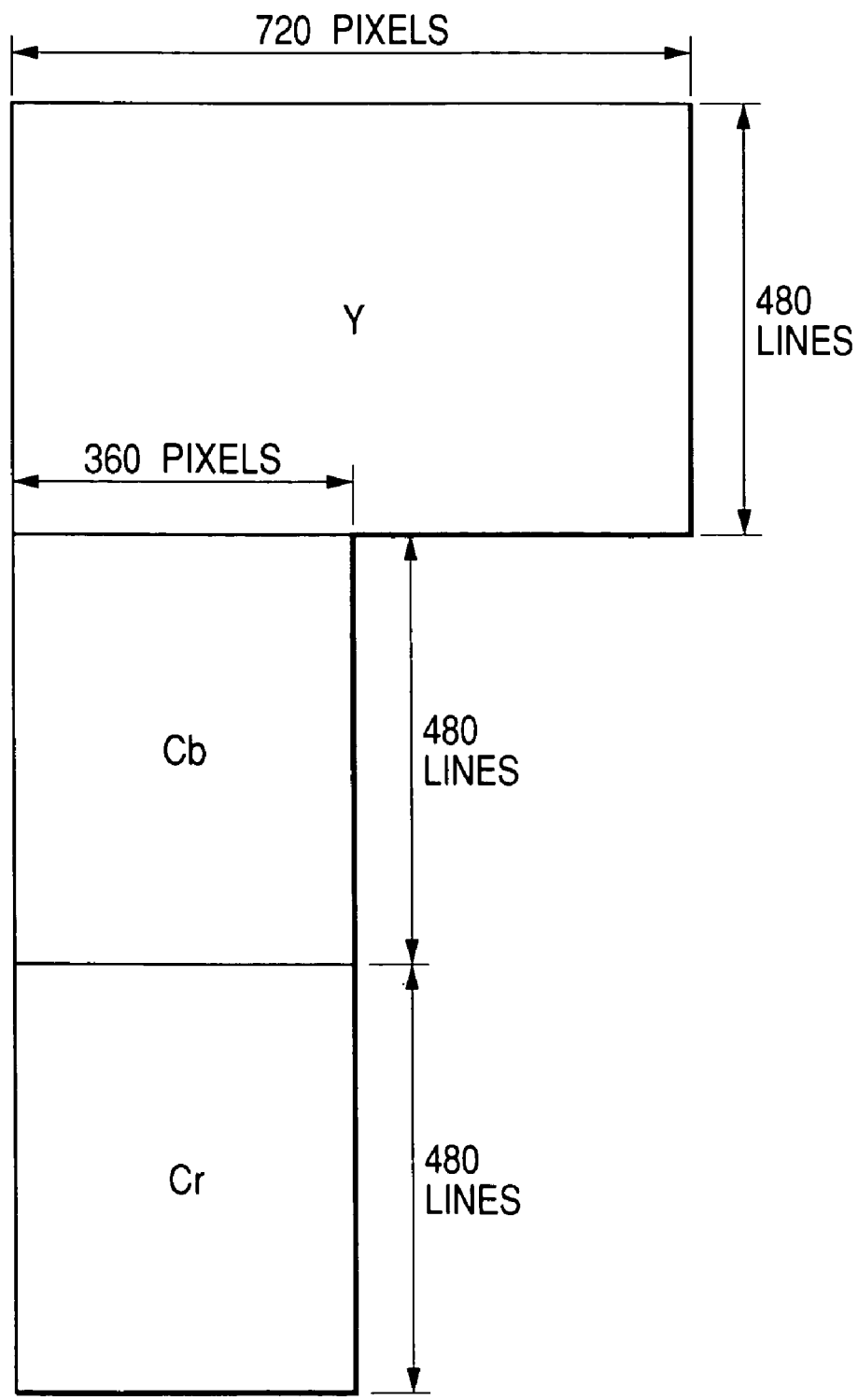
FIG. 2 is a diagram of a 1-frame-corresponding picture represented by a luminance signal Y, a 1-frame-corresponding picture represented by a first color difference signal Cb, and a 1-frame-corresponding picture represented by a second color difference signal Cr.

As shown in FIG. 2, one picture (one frame) represented by the luminance signal Y has 720 pixels in a horizontal direction, and 480 lines in a vertical direction. One picture (one frame) represented by the color difference signal Cb has 360 pixels in the horizontal direction, and 480 lines in the vertical direction. Similarly, one picture (one frame) represented by the color difference signal Cr has 360 pixels in the horizontal direction, and 480 lines in the vertical direction. Each of the luminance signal Y and the color difference signals Cb and Cr has 8 bits per pixel.

For every pixel represented by the luminance signal Y, the pixel specified-bit detector 11 determines the number "N" of lower bits starting from the lowest bit among 8 bits corresponding to the pixel in accordance with a desired strength (intensity) of an embedded watermark relative to an original picture. Here, "N" denotes a natural number smaller than 8. A fragment of a watermark can be embedded into the determined N lower bits. The pixel specified-bit detector 11 receives a control signal representing the desired strength of an embedded watermark. The control signal is fed from a suitable device such as an input device which can be accessed by a user.

Figure 3:
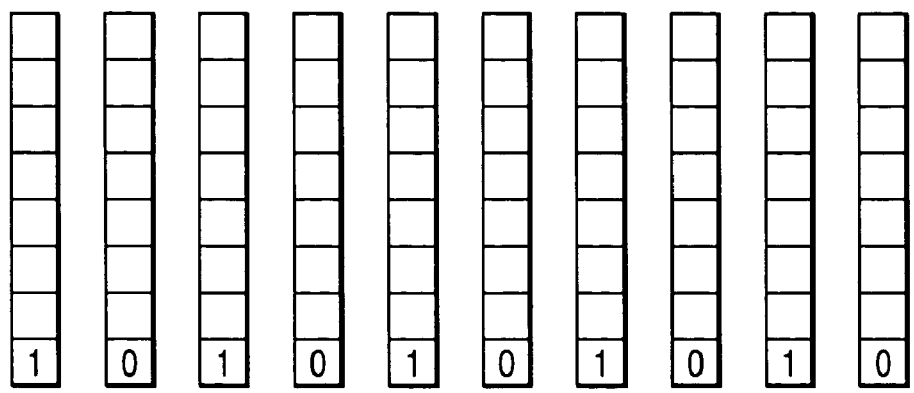
FIG. 3 is a diagram of 1-pixel-corresponding 8-bit segments of a luminance signal in which only the lowest bit among 8 bits per luminance pixel is selected as a bit into which a watermark fragment is embedded.
Figure 4:
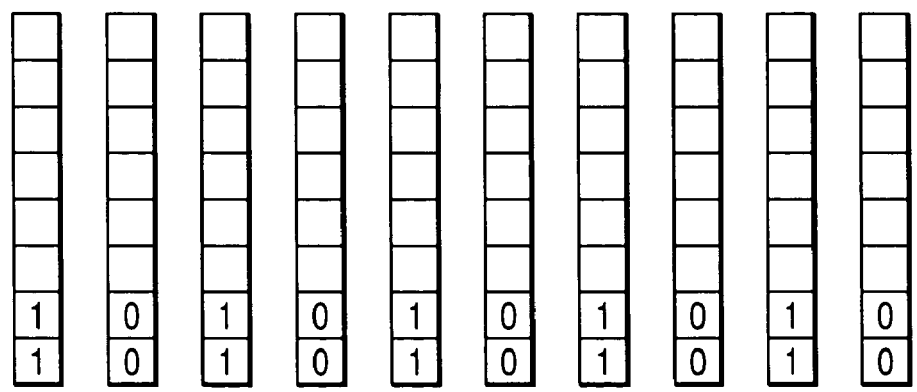
FIG. 4 is a diagram of 1-pixel-corresponding 8-bit segments of a luminance signal in which only the two lower bits among 8 bits per luminance pixel is selected as bits into which a watermark fragment is embedded.
Figure 5:
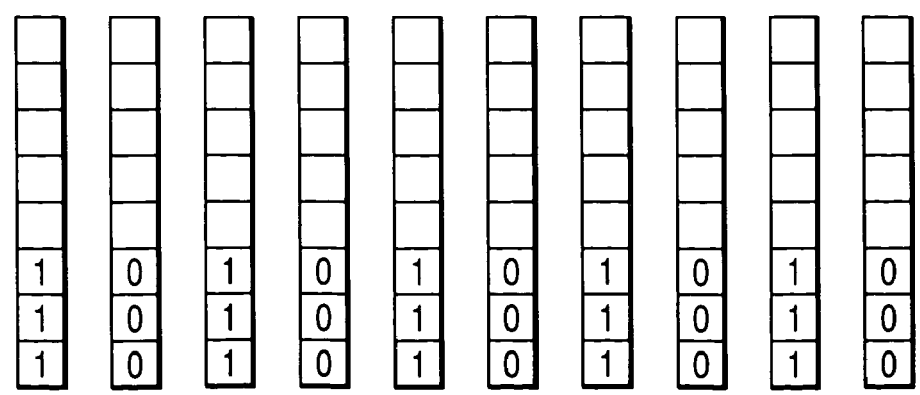
FIG. 5 is a diagram of 1-pixel-corresponding 8-bit segments of a luminance signal in which only the three lower bits among 8 bits per luminance pixel is selected as bits into which a watermark fragment is embedded.

When the desired strength of an embedded watermark relative to an original picture is the smallest, the pixel specified-bit detector 11 sets the number N to 1 and therefore designates and selects only the lowest bit among 8 bits per luminance pixel as a bit into which a watermark fragment can be embedded as shown in FIG. 3. When the desired strength of an embedded watermark relative to an original picture is the second smallest, the pixel specified-bit detector 11 sets the number N to 2 and therefore designates and selects only the two lower bits among 8 bits per luminance pixel as bits into which a watermark fragment can be embedded as shown in FIG. 4. When the desired strength of an embedded watermark relative to an original picture is the third smallest, the pixel specified-bit detector 11 sets the number N to 3 and therefore designates and designates only the three lower bits among 8 bits per luminance pixel as bits into which a watermark fragment can be embedded as shown in FIG. 5.

In this way, the number of N lower bits among 8 bits per luminance pixel into which a watermark fragment can be embedded is increased as the desired strength of the embedded watermark relative to an original picture is greater. In fact, the actual strength of an embedded watermark relative to an original picture rises in accordance with an increase in the number of N lower bits among 8 bits per luminance pixel into which a corresponding fragment of the watermark has been embedded. The original picture is less deteriorated as the strength of the embedded watermark decreases. In the case where watermark-added contents data are compressed at a high rate by an application program, the strength of the embedded watermark is preferably set to such a great value as to prevent the watermark from being erased by the compression. Thus, the strength of the embedded watermark is decided in accordance with the application program.

Watermark information (information representing a watermark) has one bit per interested pixel. Accordingly, the watermark information is "0" or "1" for every interested pixel. The watermark information is also referred to as the watermark data. In the case where only the lowest bit is selected among 8 bits per luminance pixel as a bit into which a watermark fragment can be embedded as shown in FIG. 3, a watermark information bit of "0" or "1" corresponds to a lowest luminance pixel bit of "0" or "1". In the case where only the two lower bits are selected among 8 bits per luminance pixel as bits into which a watermark fragment can be embedded as shown in FIG. 4, a watermark information bit of "0" or "1" corresponds to two lower luminance pixel bits of "00" ("0" in decimal) or "11" ("3" in decimal). In the case where only the three lower bits are selected among 8 bits per luminance pixel as bits into which a watermark fragment can be embedded as shown in FIG. 5, a watermark information bit of "0" or "1" corresponds to three lower luminance pixel bits of "000" ("0" in decimal) or "111" ("7" in decimal). As previously mentioned, the actual strength of an embedded watermark relative to an original picture rises in accordance with an increase in the number of N lower bits among 8 bits per luminance pixel into which a corresponding fragment of the watermark has been embedded.

The pixel specified-bit detector 11 outputs the designated luminance pixel bits (the selected luminance pixel bits) to the exclusive-OR device 12. The exclusive-OR device 12 includes a calculator which computes a binary luminance pixel value from the designated luminance pixel bits. In the case where only the lowest bit is selected among 8 bits per luminance pixel as a bit into which a watermark fragment can be embedded, the calculator sets a luminance pixel value to "0" for a designated luminance pixel bit of "0". The calculator sets a luminance pixel value to "1" for a designated luminance pixel bit of "1". In the case where only the two lower bits are selected among 8 bits per luminance pixel as bits into which a watermark fragment can be embedded, the calculator sets a luminance pixel value to "1" for two lower luminance pixel bits of "11" ("3" in decimal). The calculator sets a luminance pixel value to "0" for two lower luminance pixel bits different from "11". In the case where only the three lower bits are selected among 8 bits per luminance pixel as bits into which a watermark fragment can be embedded, the calculator sets a luminance pixel value to "1" for three lower luminance pixel bits of "111" ("7" in decimal). The calculator sets a luminance pixel value to "0" for three lower luminance pixel bits different from "111". The exclusive-OR device 12 receives bits composing watermark information from the fixed-pattern generator 14. The exclusive-OR device 12 processes the luminance pixel values by calculation in response to the watermark information bits. The exclusive-OR device 12 outputs the processing-resultant luminance pixel values to the watermark mixer 15.

Figures 6, 7, 8:
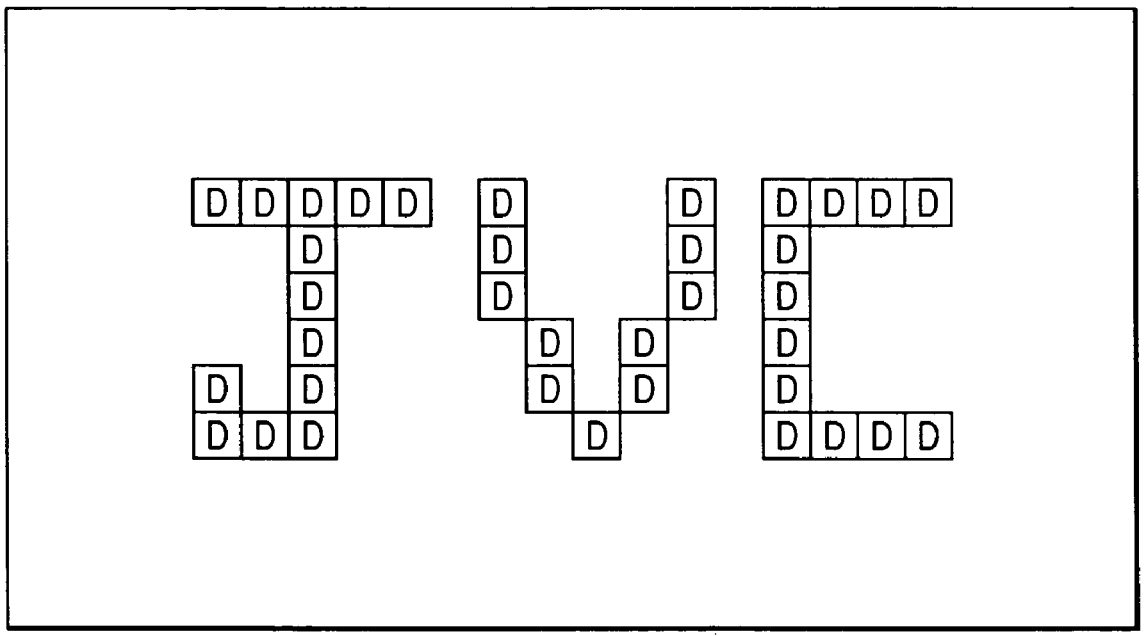
FIG. 6 is a diagram of an example of a watermark.
FIG. 7 is a diagram of an example of a fixed 3-by-3-bit pattern produced by a fixed-pattern generator in the apparatus of FIG. 1.
FIG. 8 is a diagram of a specified 3-by-3-bit pattern used in the apparatus of FIG. 1.

The memory 16 stores map data representing a watermark. FIG. 6 shows an example of the watermark, "JVC", which is represented by the map data. A frame represented by the map data is composed of divided rectangular blocks each having, for example, 81 neighboring luminance pixels being 9 luminance pixels in a horizontal direction by 9 luminance pixels in a vertical direction. Prescribed blocks D selected among the divided rectangular blocks represent the watermark, "JVC". The map data indicate the positions of the prescribed blocks D with respect to the frame. The positions of the prescribed blocks D correspond to watermark-embedding positions. The memory 16 outputs the watermark map data to the embedding-position detector 13. The watermark map data may be fed to the embedding-position detector 13 from an external.

The embedding-position detector 13 derives the watermark-embedding positions from the watermark map data. The embedding-position detector 13 converts the watermark-embedding positions into addresses (watermark-embedding addresses) defined in the case where the prescribed blocks D are scanned in a raster scanning order. The embedding-position detector 13 notifies the watermark-embedding addresses to the fixed-pattern generator 14.

For each of the watermark-embedding addresses notified by the embedding-position detector 13, the fixed-pattern generator 14 produces, for example, 9 bits in a fixed pattern which correspond to 9 neighboring pixels being 3 luminance pixels in a horizontal direction by 3 luminance pixels in a vertical direction. FIG. 7 shows an example of the fixed pattern of 9 bits (3 by 3 bits). Preferably, the fixed-pattern generator 14 includes a memory storing the fixed-pattern bits. The fixed-pattern generator 14 feeds the fixed-pattern bits to the exclusive-OR device 12 as watermark information bits. For other positions (addresses) in a frame, the fixed-pattern generator 14 does not feed the fixed-pattern bits to the exclusive-OR device 12 or outputs a signal of "0" to the exclusive-OR device 12. The fixed-pattern generator 14 notifies the exclusive-OR device 12 of the watermark-embedding addresses.

The exclusive-OR device 12 includes a memory storing 9 bits in a specified pattern which correspond to 9 neighboring pixels being 3 luminance pixels in a horizontal direction by 3 luminance pixels in a vertical direction. FIG. 8 shows an example of the specified pattern of 9 bits (3 by 3 bits). The exclusive-OR device 12 also includes a section for processing, in response to the watermark information bits, the luminance pixel values corresponding to the watermark-embedding addresses. Specifically, for each of the watermark-embedding addresses, the processing section of the exclusive-OR device 12 executes exclusive-OR operation between the watermark information bits (the fixed-pattern bits) and the specified-pattern bits on a bit-by-bit basis. The processing section forcedly sets or equalizes the corresponding luminance pixel values to the result of the exclusive-OR operation, for example, "111111111". The exclusive-OR device 12 outputs data representative of the processing-resultant luminance pixel values to the watermark mixer 15. The exclusive-OR device 12 may notify the watermark mixer 15 of the exclusive-OR operation result and the addresses of the related luminance pixel values.

In other words, the processing section of the exclusive-OR device 12 calculates a 9-bit pattern which can be converted into the specified bit pattern (see FIG. 8) by exclusive-OR operation with the fixed bit pattern (see FIG. 7). The processing section forcedly sets or equalizes the corresponding luminance pixel values to the calculated 9-bit pattern. An example of the calculated 9-bit pattern is "111111111". The exclusive-OR device 12 outputs data representative of the processing-resultant luminance pixel values (that is, the calculated 9-bit pattern) to the watermark mixer 15.

The watermark mixer 15 places the output data from the exclusive-OR device 12 in the corresponding luminance pixel bits of the original picture data which are designated and selected by the pixel specified-bit detector 11. In other words, the watermark mixer 15 replaces the contents of the designated luminance pixel bits (the selected luminance pixel bits) with the contents of the output data from the exclusive-OR device 12. Thus, the watermark mixer 15 rewrites or updates the designated luminance pixel bits into agreement with the output data from the exclusive-OR device 12. As a result, the calculated 9-bit pattern is embedded into each of portions of the original picture data which correspond to the watermark-embedding addresses. The watermark mixer 15 outputs the updating-resultant designated luminance pixel bits. The watermark mixer 15 outputs other bits of the original picture data without changing them. Thus, the watermark mixer 15 outputs the other bits as they are. The updating-resultant designated luminance pixel bits and the other bits outputted from the watermark mixer 15 compose watermarked picture information, that is, watermark-added picture data. A known device (not shown) records the watermark-added picture data on a recording medium.

As understood from FIGS. 7 and 8, the fixed bit pattern produced by the fixed-pattern generator 14, the specified bit pattern, and the embedded bit pattern remain unchanged when being rotated through 90, 180, or 270 degrees. Accordingly, even in the case where the watermark-added picture data are processed by steps including a step of rotating the represented image through 90, 180, or 270 degrees, the watermark can be detected from the processing-resultant picture data.

Figure 9:
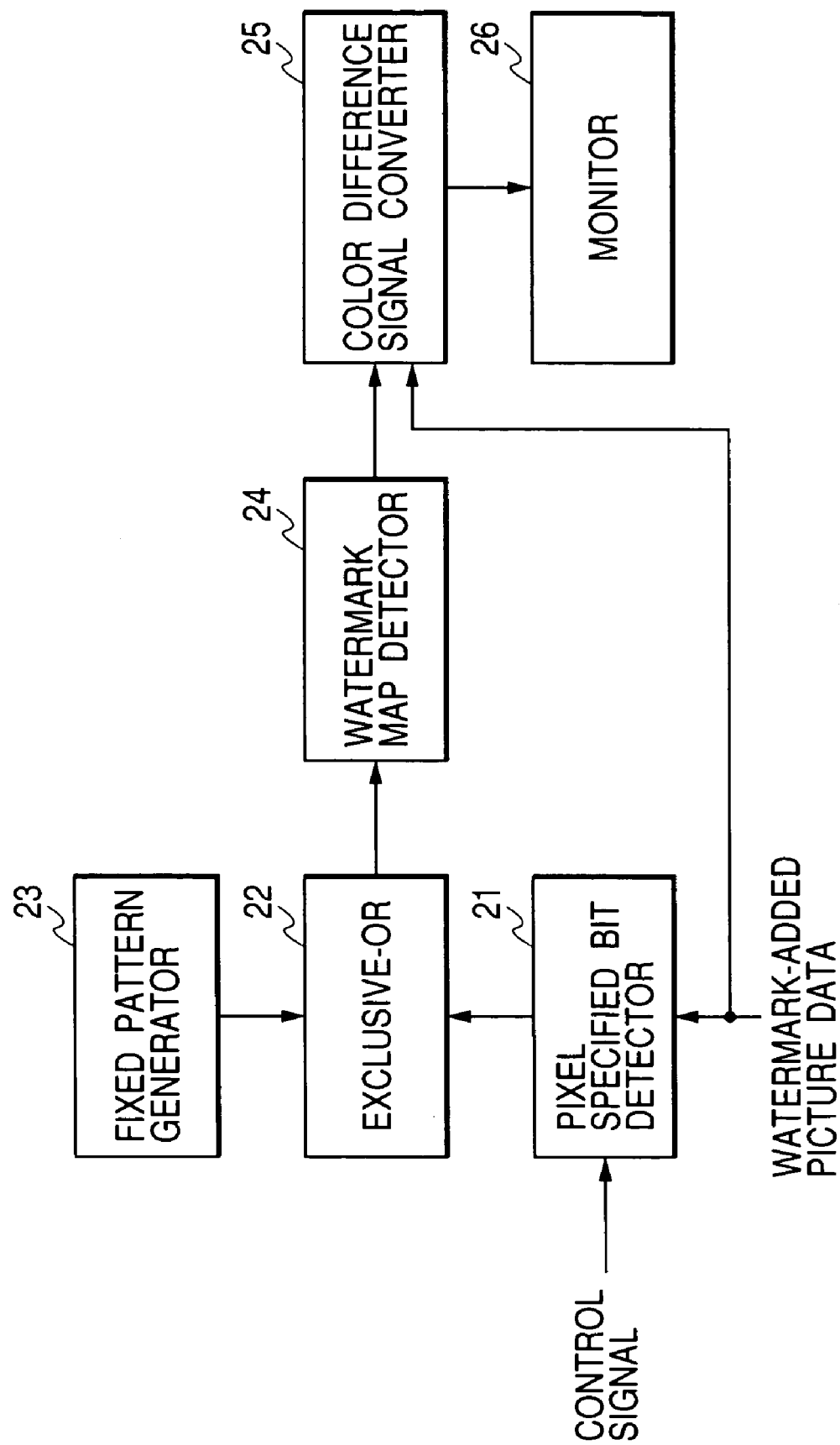
FIG. 9 is a block diagram of an apparatus for reproducing or extracting a watermark from watermarked contents data (watermark-added contents data) according to the first embodiment of this invention.

FIG. 9 shows an apparatus for reproducing or extracting a watermark from watermarked contents data (watermark-added contents data) according to the first embodiment of this invention. The apparatus of FIG. 9 includes a pixel specified-bit detector 21, an exclusive-OR device 22, a fixed-pattern generator 23, a watermark map data detector 24, a color difference signal converter 25, and a monitor 26. The pixel specified-bit detector 21 is connected to a first input terminal of the exclusive-OR device 22. The fixed-pattern generator 23 is connected to a second input terminal of the exclusive-OR device 22. The output terminal of the exclusive-OR device 22 is connected to the watermark map data detector 24. The watermark map data detector 24 is connected to the color difference signal converter 25. The color difference signal converter 25 is connected to the monitor 26.

Watermark-added picture data (watermarked contents data) are fed to the pixel specified-bit detector 21 and the color difference signal converter 25. A suitable device (not shown) reproduces the watermark-added picture data from a recording medium, and feeds them to the pixel specified-bit detector 21 and the color difference signal converter 25. Originally, the watermark-added picture data are generated by the apparatus of FIG. 1. The watermark-added picture data are composed of a watermark-added luminance signal Y and color difference signals Cb and Cr. Each of the watermark-added luminance signal Y and the color difference signals Cb and Cr has 8 bits per pixel.

For every pixel represented by the luminance signal Y, the pixel specified-bit detector 21 determines the number "N" of lower bits starting from the lowest bit among 8 bits corresponding to the pixel in accordance with the strength (intensity) of the embedded watermark relative to the original picture. Here, "N" denotes a natural number smaller than 8. A fragment of the watermark is embedded in the determined N lower bits. The pixel specified-bit detector 21 receives a control signal representing the strength of the embedded watermark. The control signal is fed from a suitable device such as an input device which can be accessed by a user.

Generally, the strength of the watermark embedded by the apparatus of FIG. 1 is previously known to the apparatus of FIG. 9 since the watermark strength is decided in accordance with the application program as previously mentioned. Preferably, a signal representing the strength of the embedded watermark is not transmitted together with the watermark-added picture data. Alternatively, a signal representing the strength of the embedded watermark may be contained in the watermark-added picture data. According to a first example, the left-upper corner pixel in every frame represented by the watermark-added picture data is loaded with a signal representing the strength of the embedded watermark. According to a second example, a header of the watermark-added picture data is loaded with a signal representing the strength of the embedded watermark. In these cases, the signal representing the strength of the embedded watermark is transmitted together with the watermark-added picture data.

When the strength of the embedded watermark relative to the original picture is the smallest, the pixel specified-bit detector 21 sets the number N to 1 and therefore designates and selects only the lowest bit among 8 bits per luminance pixel as a bit in which a fragment of the watermark is embedded as shown in FIG. 3. When the strength of the embedded watermark relative to the original picture is the second smallest, the pixel specified-bit detector 21 sets the number N to 2 and therefore designates and selects only the two lower bits among 8 bits per luminance pixel as bits in which a fragment of the watermark is embedded as shown in FIG. 4. When the strength of the embedded watermark relative to the original picture is the third smallest, the pixel specified-bit detector 21 sets the number N to 3 and therefore designates and designates only the three lower bits among 8 bits per luminance pixel as bits in which a fragment of the watermark is embedded as shown in FIG. 5.

The pixel specified-bit detector 21 outputs the designated luminance pixel bits (the selected luminance pixel bits) to the exclusive-OR device 22. The exclusive-OR device 22 includes a calculator which computes a binary luminance pixel value from the designated luminance pixel bits. In the case where only the lowest bit is selected among 8 bits per luminance pixel as a bit in which a fragment of the watermark is embedded, the calculator sets a luminance pixel value to "0" for a designated luminance pixel bit of "0". The calculator sets a luminance pixel value to "1" for a designated luminance pixel bit of "1". In the case where only the two lower bits are selected among 8 bits per luminance pixel as bits in which a fragment of the watermark is embedded, the calculator sets a luminance pixel value to "1" for two lower luminance pixel bits of "11" ("3" in decimal). The calculator sets a luminance pixel value to "0" for two lower luminance pixel bits different from "11". In the case where only the three lower bits are selected among 8 bits per luminance pixel as bits in which a fragment of the watermark is embedded, the calculator sets a luminance pixel value to "1" for three lower luminance pixel bits of "111" ("7" in decimal). The calculator sets a luminance pixel value to "0" for three lower luminance pixel bits different from "111".

The fixed-pattern generator 23 includes a memory storing bits in a fixed pattern. The number of the fixed-pattern bits is equal to, for example, 9. The fixed bit pattern corresponds to, for example, 9 neighboring pixels being 3 luminance pixels in a horizontal direction by 3 luminance pixels in a vertical direction. The fixed bit pattern produced by the fixed-pattern generator 23 is the same as that produced by the fixed-pattern generator 14 in the apparatus of FIG. 1. For example, the fixed bit pattern produced by the fixed-pattern generator 23 is identical with that in FIG. 7. The fixed-pattern generator 23 outputs the bits in the fixed pattern to the exclusive-OR device 22.

For every 3 by 3 neighboring luminance pixels, the device 22 executes exclusive-OR operation between the luminance pixel values and the fixed-pattern bits on a bit-by-bit basis. The exclusive-OR device 22 outputs data representative of the results of exclusive-OR operation to the watermark map data detector 24.

The exclusive-OR device 22 includes a memory storing 9 bits in a specified pattern which correspond to 9 neighboring pixels being 3 luminance pixels in a horizontal direction by 3 luminance pixels in a vertical direction. The specified bit pattern is the same as that used in the apparatus of FIG. 1. For example, the specified bit pattern is identical with that in FIG. 8. The exclusive-OR device 22 further includes a deciding section (a comparing section). For every 3 by 3 neighboring luminance pixels, the deciding section determines whether or not the bit pattern represented by the operation-result data is equal to the specified bit pattern. When the bit pattern represented by the operation-result data is equal to the specified bit pattern, the deciding section determines that the operation-resultant data have a watermark fragment. In this case, the deciding section computes the position of 3 by 3 neighboring luminance pixels represented by the operation-resultant data. The computed position is defined relative to the frame. The computed position is referred as the watermark position. The deciding section notifies the watermark position to the watermark map data detector 24. On the other hand, when the bit pattern represented by the operation-result data is different from the specified bit pattern, the deciding section determines that the operation-resultant data do not have any watermark fragment. In this case, the deciding section does not implement the position computing step.

The watermark map data detector 24 generates a central address of a rectangular block of, for example, 9 neighboring luminance pixels (3 luminance pixels in a horizontal direction by 3 luminance pixels in a vertical direction) from each of the watermark positions notified by the exclusive-OR device 22. The rectangular blocks correspond to the prescribed blocks D representing the watermark, for example, "JVC" in FIG. 6. The watermark map data detector 24 notifies the generated watermark block addresses to the color difference signal converter 25.

The watermark map data detector 24 may include a memory storing font information representing the thicknesses and shapes of letters and characters. In this case, a reproduced watermark can be indicated as high-quality letters and characters on the monitor 26.

The color difference signal converter 25 processes only "red" components of the color difference signals in the watermark-added picture data which represent pixels in the watermark blocks having the addresses notified by the watermark map data detector 24. Specifically, regarding "red" components to be processed, the color difference signal converter 25 forcedly sets each 1-pixel-corresponding 8-bit "red" signal component to the maximum value, "255". The color difference signal converter 25 outputs the processing-resultant "red" components of the color difference signals to the monitor 26. On the other hand, the color difference signal converter 25 does not process "blue" and "green" components of the color difference signals in the watermark-added picture data which represent pixels in the watermark blocks having the addresses notified by the watermark map data detector 24. The color difference signal converter 25 passes these "blue" and "green" components of the color difference signals to the monitor 26 without changing them. Also, the color difference signal converter 25 does not process the luminance signal in the watermark-added picture data which represent pixels in the watermark blocks having the addresses notified by the watermark map data detector 24. The color difference signal converter 25 passes the luminance signal to the monitor 26 without changing it. Furthermore, the color difference signal converter 25 does not process the watermark-added picture data which represent pixels outside the watermark blocks having the addresses notified by the watermark map data detector 24. The color difference signal converter 25 outputs the unprocessed watermark-added picture data to the monitor 26.

The monitor 26 displays an image represented by the watermark-added picture data outputted from the color difference signal converter 25. In the displayed image, pixels in the watermark blocks are forcedly colored red while other pixels have original colors. Therefore, the watermark (for example, "JVC") is indicated as red portions of the displayed image which form the foreground in the original picture. As a result, the user can identify the watermark.

The apparatus of FIG. 1 may transmit the watermark-added picture data to a communication network such as the Internet, a wire communication network, or a radio communication network.

The apparatus of FIG. 9 may receive the watermark-added picture data from a communication network such as the Internet, a wire communication network, or a radio communication network.

The apparatus of FIG. 9 may be modified to indicate the watermark as displayed image portions having a color different from red. Alternatively, the apparatus of FIG. 9 may be modified to indicate the watermark by changing the luminance signal in the watermark-added picture data. The apparatus of FIG. 9 may be modified to indicate the watermark by changing at least one of the luminance signal and the color difference signals in the watermark-added picture data which represent pixels surrounding the watermark blocks.

The apparatus of FIG. 1 may be formed by a computer system or a processor-based system programmed to execute the previously-indicated steps of operation. Similarly, the apparatus of FIG. 9 may be formed by a computer system or a processor-based system programmed to execute the previously-indicated steps of operation.

Second Embodiment

Figure 10:
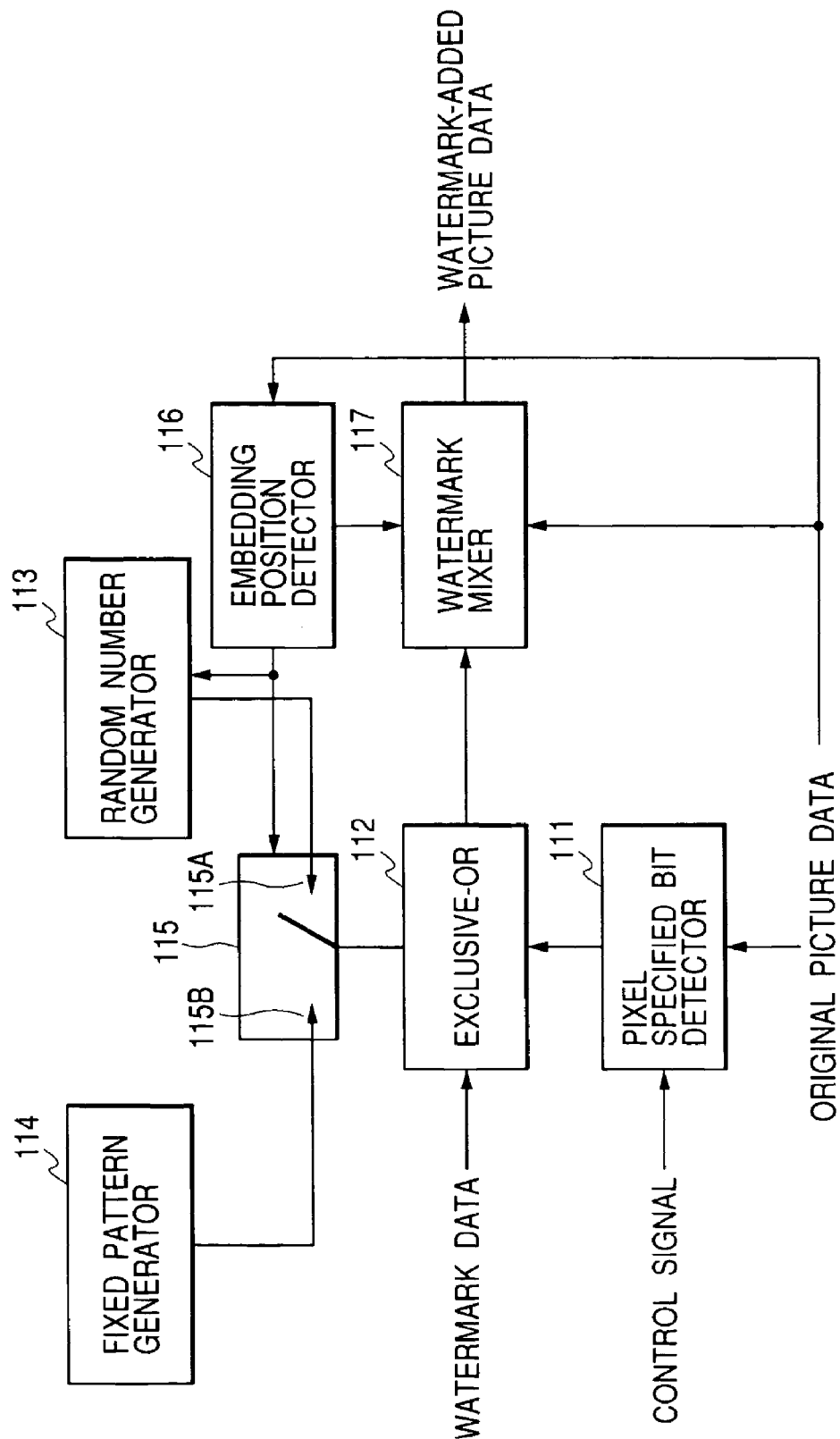
FIG. 10 is a block diagram of an apparatus for embedding or inserting a watermark into contents data according to a second embodiment of this invention.

FIG. 10 shows an apparatus for embedding or inserting a watermark into contents data according to a second embodiment of this invention. The apparatus of FIG. 10 includes a pixel specified-bit detector 111, an exclusive-OR device 112, a random-number generator 113, a fixed-pattern generator 114, a switch 115, an embedding-position detector (an embedding-position deciding device) 116, and a watermark mixer 117. The pixel specified-bit detector 111 is connected to the exclusive-OR device 112. The exclusive-OR device 112 is connected to the switch 115 and the watermark mixer 117. The random-number generator 113 is connected to the switch 115 and the embedding-position detector 116. The fixed-pattern generator 114 is connected to the switch 115. The embedding-position detector 116 is connected to the switch 115 and the watermark mixer 117.

Contents data representing an original picture or a sequence of original pictures are fed to the pixel specified-bit detector 111, the embedding-position detector 116, and the watermark mixer 117. The original picture data (the contents data) are composed of a luminance signal Y and color difference signals Cb and Cr.

As shown in FIG. 2, one picture (one frame) represented by the luminance signal Y has 720 pixels in a horizontal direction, and 480 lines in a vertical direction. One picture (one frame) represented by the color difference signal Cb has 360 pixels in the horizontal direction, and 480 lines in the vertical direction. Similarly, one picture (one frame) represented by the color difference signal Cr has 360 pixels in the horizontal direction, and 480 lines in the vertical direction. Each of the luminance signal Y and the color difference signals Cb and Cr has 8 bits per pixel.

Figure 11:
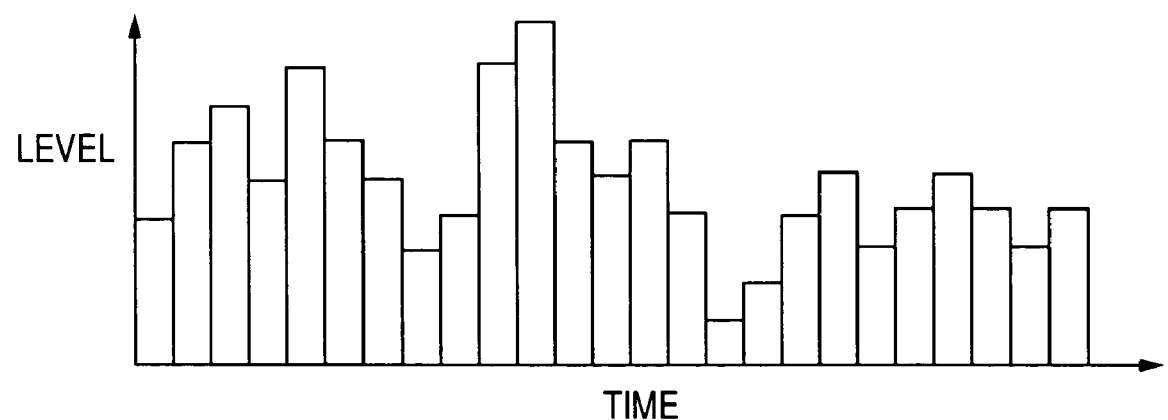
FIG. 11 is a time-domain diagram of an example of the level represented by a digital audio signal sample.

The original picture data may be replaced by audio data having a sequence of digital signal samples each having a prescribed number of bits, for example, 16 bits. The level represented by a digital signal sample varies in time domain as shown in FIG. 11.

For every pixel represented by the luminance signal Y, the pixel specified-bit detector 111 determines the number "N" of lower bits starting from the lowest bit among 8 bits corresponding to the pixel in accordance with a desired strength (intensity) of an embedded watermark relative to an original picture. Here, "N" denotes a natural number smaller than 8. A fragment of a watermark can be embedded into the determined N lower bits. The pixel specified-bit detector 111 receives a control signal representing the desired strength of an embedded watermark. The control signal is fed from a suitable device such as an input device which can be accessed by a user.

When the desired strength of an embedded watermark relative to an original picture is the smallest, the pixel specified-bit detector 111 sets the number N to 1 and therefore designates and selects only the lowest bit among 8 bits per luminance pixel as a bit into which a watermark fragment can be embedded as shown in FIG. 3. When the desired strength of an embedded watermark relative to an original picture is the second smallest, the pixel specified-bit detector 111 sets the number N to 2 and therefore designates and selects only the two lower bits among 8 bits per luminance pixel as bits into which a watermark fragment can be embedded as shown in FIG. 4. When the desired strength of an embedded watermark relative to an original picture is the third smallest, the pixel specified-bit detector 111 sets the number N to 3 and therefore designates and designates only the three lower bits among 8 bits per luminance pixel as bits into which a watermark fragment can be embedded as shown in FIG. 5.

In this way, the number of N lower bits among 8 bits per luminance pixel into which a watermark fragment can be embedded is increased as the desired strength of the embedded watermark relative to an original picture is greater. In fact, the actual strength of an embedded watermark relative to an original picture rises in accordance with an increase in the number of N lower bits among 8 bits per luminance pixel into which a corresponding fragment of the watermark has been embedded. The original picture is less deteriorated as the strength of the embedded watermark decreases. In the case where watermark-added contents data are compressed at a high rate by an application program, the strength of the embedded watermark is preferably set to such a great value as to prevent the watermark from being erased by the compression. Thus, the strength of the embedded watermark is decided in accordance with the application program.

Watermark information (information representing a watermark) has one bit per interested pixel. Accordingly, the watermark information is "0" or "1" for every interested pixel. The watermark information is also referred to as the watermark data. In the case where only the lowest bit is selected among 8 bits per luminance pixel as a bit into which a watermark fragment can be embedded as shown in FIG. 3, a watermark information bit of "0" or "1" corresponds to a lowest luminance pixel bit of "0" or "1". In the case where only the two lower bits are selected among 8 bits per luminance pixel as bits into which a watermark fragment can be embedded as shown in FIG. 4, a watermark information bit of "0" or "1" corresponds to two lower luminance pixel bits of "00" ("0" in decimal) or "11" ("3" in decimal). In the case where only the three lower bits are selected among 8 bits per luminance pixel as bits into which a watermark fragment can be embedded as shown in FIG. 5, a watermark information bit of "0" or "1" corresponds to three lower luminance pixel bits of "000" ("0" in decimal) or "111" ("7" in decimal). As previously mentioned, the actual strength of an embedded watermark relative to an original picture rises in accordance with an increase in the number of N lower bits among 8 bits per luminance pixel into which a corresponding fragment of the watermark has been embedded.

The pixel specified-bit detector 111 outputs the designated luminance pixel bits (the selected luminance pixel bits) to the exclusive-OR device 112. The exclusive-OR device 112 includes a calculator which computes a binary luminance pixel value from the designated luminance pixel bits. In the case where only the lowest bit is selected among 8 bits per luminance pixel as a bit into which a watermark fragment can be embedded, the calculator sets a luminance pixel value to "0" for a designated luminance pixel bit of "0". The calculator sets a luminance pixel value to "1" for a designated luminance pixel bit of "1". In the case where only the two lower bits are selected among 8 bits per luminance pixel as bits into which a watermark fragment can be embedded, the calculator sets a luminance pixel value to "1" for two lower luminance pixel bits of "11" ("3" in decimal). The calculator sets a luminance pixel value to "0" for two lower luminance pixel bits different from "11". In the case where only the three lower bits are selected among 8 bits per luminance pixel as bits into which a watermark fragment can be embedded, the calculator sets a luminance pixel value to "1" for three lower luminance pixel bits of "111" ("7" in decimal). The calculator sets a luminance pixel value to "0" for three lower luminance pixel bits different from "111".

Figure 12:
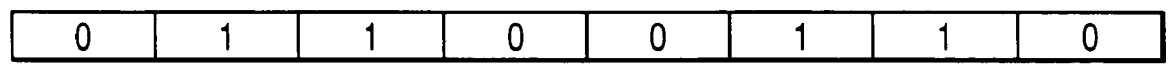
FIG. 12 is a diagram of an example of a fixed 8-bit pattern produced by a fixed-pattern generator in the apparatus of FIG. 10.

The fixed-pattern generator 114 includes a memory storing a given number of bits, for example, 8 bits, in a fixed pattern. The fixed-pattern generator 114 outputs the fixed-pattern bits to a terminal 115B of the switch 115. The fixed bit pattern is, for example, "01100110" as shown in FIG. 12.

The random-number generator 113 produces data representing a number which varies at random. The random-number generator 113 outputs the random-number data to a terminal 115A of the switch 115.

The switch 115 selects either the fixed-pattern bits or the random-number data, and passes either the fixed-pattern bits or the random-number data to the exclusive-OR device 112 under control by the embedding-position detector 116.

The embedding-position detector 116 includes a memory storing prescribed address ranges (prescribed positions) into which a watermark will be embedded. The embedding-position detector 116 further includes a section (a comparing section) for deciding whether or not the address currently related to the original picture data reaches one of the watermark-embedding address ranges (the watermark-embedding positions). When the current address reaches one of the watermark-embedding address ranges, the embedding-position detector 116 controls the switch 115 to select the fixed-pattern bits. Thus, the switch 115 transmits the fixed-pattern bits from the fixed-pattern generator 114 to the exclusive-OR device 112. Subsequently, the embedding-position detector 116 controls the switch 115 to select the random-number data instead of the fixed-pattern bits before the current address moves out of the watermark-embedding address range. Thus, the switch 115 transmits the random-number data from the random-number generator 113 to the exclusive-OR device 112. In this way, when the current address reaches one of the watermark-embedding address ranges, a succession of the fixed-pattern bits and the random-number data is fed to the exclusive-OR device 112 from the switch 115.

Figure 13:
FIG. 13 is a diagram of an example of a specified 8-bit pattern used in the apparatus of FIG. 10.

When receiving the fixed-pattern bits from the switch 115, the exclusive-OR device 112 arranges the corresponding luminance pixel values (for example, the corresponding 8 successive luminance pixel values) in a raster scanning order and processes the corresponding luminance pixel values by calculation in response to the fixed-pattern bits. Specifically, the exclusive-OR device 112 20 includes a memory storing, for example, 8 bits in a specified pattern. The specified bit pattern is, for example, "11110000" as shown in FIG. 13. The exclusive-OR device 112 also includes a section for processing, in response to the fixed-pattern bits, the luminance pixel values corresponding to the watermark-embedding address ranges. In more detail, for each of the watermark-embedding address ranges, the processing section of the exclusive-OR device 112 executes exclusive-OR operation between the fixed-pattern bits and the specified-pattern bits on a bit-by-bit basis. The processing section forcedly sets or equalizes the corresponding luminance pixel values to the result of the exclusive-OR operation, for example, "10010110" as viewed in the raster scanning order. The exclusive-OR device 112 outputs data representative of the processing-resultant luminance pixel values to the watermark mixer 117. The exclusive-OR device 112 may notify the watermark mixer 117 of the exclusive-OR operation result and the address of the related luminance pixel values.

In other words, the processing section of the exclusive-OR device 112 calculates an 8-bit pattern which can be converted into the specified bit pattern (see FIG. 13) by exclusive-OR operation with the fixed bit pattern (see FIG. 12). The processing section forcedly sets or equalizes the corresponding luminance pixel values to the calculated 8-bit pattern. An example of the calculated 8-bit pattern is "10010110" as viewed in the raster scanning order. The exclusive-OR device 112 outputs data representative of the processing-resultant luminance pixel values (that is, the calculated 8-bit pattern) to the watermark mixer 117.

The exclusive-OR device 112 receives watermark data (data representative of a watermark) from a suitable device such as a memory or an input device. The watermark data are also referred to as the watermark information. When receiving the random-number data from the switch 115, the exclusive-OR device 112 executes exclusive-OR operation between the random-number data and the watermark data on a bit-by-bit basis. The exclusive-OR device 112 outputs data representative of the results of exclusive-OR operation to the watermark mixer 117.

The embedding-position detector 116 generates a control signal depending on whether or not the address currently related to the original picture data is in one of the watermark-embedding address ranges (the watermark-embedding positions). The embedding-position detector 116 outputs the generated control signal to the watermark mixer 117. The watermark mixer 117 responds to the control signal. Specifically, when the control signal indicates that the address currently related to the original picture data is in one of the watermark-embedding address ranges, the watermark mixer 117 places the output data from the exclusive-OR device 112 in the luminance pixel bits of the original picture data which are designated and selected by the pixel specified-bit detector 111. In other words, the watermark mixer 117 replaces the contents of the designated luminance pixel bits (the selected luminance pixel bits) with the contents of the output data from the exclusive-OR device 112. Thus, the watermark mixer 117 rewrites or updates the designated luminance pixel bits into agreement with the output data from the exclusive-OR device 112. As a result, the calculated 8-bit pattern and the watermark data are embedded into each of portions of the original picture data which correspond to the watermark-embedding address ranges. The watermark mixer 117 outputs the updating-resultant designated luminance pixel bits. The watermark mixer 117 outputs other bits of the original picture data without changing them. Thus, the watermark mixer 117 outputs the other bits as they are. Specifically, when the control signal indicates that the address currently related to the original picture data is outside the watermark-embedding address ranges, the watermark mixer 117 passes the original picture data as they are. The updating-resultant designated luminance pixel bits and the other bits outputted from the watermark mixer 117 compose watermarked picture information, that is, watermark-added picture data. A known device (not shown) records the watermark-added picture data on a recording medium.

As previously mentioned, the embedding-position detector 116 stores prescribed address ranges (prescribed positions) into which a watermark will be embedded. The prescribed address ranges correspond to watermark-embedding blocks E which disperse in a frame as shown in FIG. 14.

The embedding-position detector 116 may be modified as follows. A first modification of the embedding-position detector 116 generates address ranges in response to the original picture data, and uses the generated address ranges instead of the prescribed address ranges. Regarding an image represented by the original picture data, the first modification of the embedding-position detector 116 calculates the degree of the complexity of each of 8-by-8-pixel image portions. The first modification of the embedding-position detector 116 compares the calculated complexity degree with a prescribed value. The first modification of the embedding-position detector 116 generates address ranges in accordance with the positions of 8-by-8-pixel image portions having calculated complexity degrees equal to or greater than the prescribed value. The use of highly complex image portions as watermark-embedding blocks reduces a visually-sensible deterioration in image quality which is caused by watermarking. A second modification of the embedding-position detector 116 generates address ranges in response to the original picture data, and uses the generated address ranges instead of the prescribed address ranges. Regarding an image represented by the original picture data, the second modification of the embedding-position detector 116 detects the contours of separate and distinct image portions. The second modification of the embedding-position detector 116 generates address ranges in accordance with the detected contours. The use of contours as watermark-embedding blocks enables a watermark to remain at a higher possibility even when signal processing to cut out a portion from a watermark-added image is carried out.

As previously mentioned, the embedding-position detector 116 decides whether or not the address currently related to the original picture data reaches one of the watermark-embedding address ranges (the watermark-embedding positions). When the current address reaches one of the watermark-embedding address ranges, the embedding-position detector 116 controls the switch 115 to select the fixed-pattern bits. Thus, the switch 115 transmits the fixed-pattern bits to the exclusive-OR device 112. As previously mentioned, the exclusive-OR device 112 processes the luminance pixel values in response to the fixed-pattern bits. During a time interval before the current address moves out of the watermark-embedding address range, when the signal processing by the exclusive-OR device 112 in response to the fixed-pattern bits is completed, the embedding-position detector 116 starts the random-number generator 113 and controls the switch 115 to select the random-number data instead of the fixed-pattern bits. Thus, the switch 115 transmits the random-number data to the exclusive-OR device 112 instead of the fixed-pattern bits. In this way, when the current address reaches one of the watermark-embedding address ranges, a succession of the fixed-pattern bits and the random-number data is fed to the exclusive-OR device 112 from the switch 115.

Figure 14:
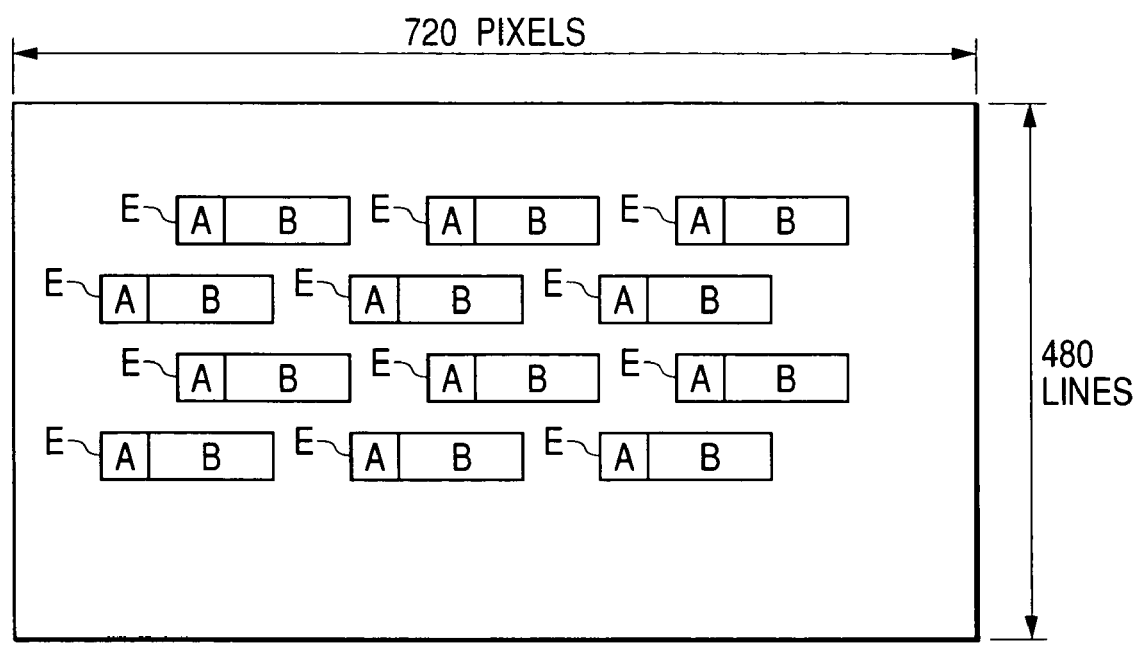
FIG. 14 is a diagram of a frame in which watermark-embedding blocks disperse.

As shown in FIG. 14, each of the watermark-embedding blocks E is divided into a former portion "A" and a latter portion "B". The former portion "A" is immediately followed by the latter portion "B" in the raster scanning order. The calculated 8-bit pattern (for example, "10010110") depending on the fixed-pattern bits is assigned to the former portions "A" of the watermark-embedding blocks E. On the other hand, the results of exclusive-OR operation between the random-number data and the watermark data are assigned to the latter portions "B" of the watermark-embedding blocks E. In more detail, for each of the former portions "A" of the watermark-embedding blocks E, the watermark mixer 117 places the calculated 8-bit pattern in the luminance pixel bits of the original picture data which are designated and selected by the pixel specified-bit detector 111. In other words, the watermark mixer 117 replaces the contents of the designated luminance pixel bits (the selected luminance pixel bits) with the calculated 8-bit pattern. For the latter portions "B" of the watermark-embedding blocks E, the watermark mixer 117 places the results of exclusive-OR operation between the random-number data and the watermark data in the luminance pixel bits of the original picture data which are designated and selected by the pixel specified-bit detector 111. In other words, the watermark mixer 117 replaces the contents of the designated luminance pixel bits (the selected luminance pixel bits) with the contents of the results of exclusive-OR operation between the random-number data and the watermark data.

Figure 15:
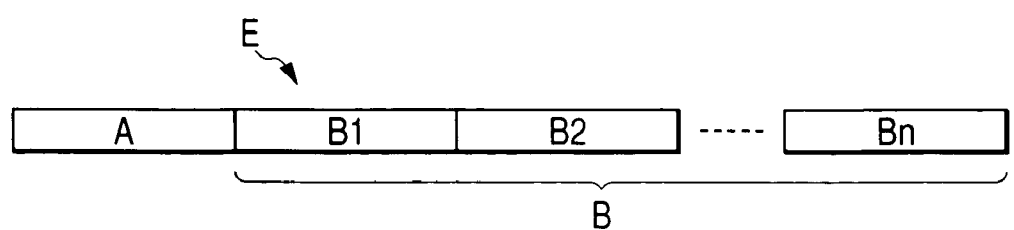
FIG. 15 is a diagram of the details of a watermark-embedding block in FIG. 14.

Preferably, the watermark data have a predetermined number "n" of bytes. In this case, as shown in FIG. 15, the latter portion "B" of each watermark-embedding block E is divided into 1-byte sub-portions B1, B2, . . . , and Bn. First, second, . . . , and n-th bytes of the results of exclusive-OR operation between the random-number data and the watermark data are placed in the watermark-embedding-block sub-portions B1, B2, . . . , and Bn, respectively.

Preferably, the generation of the random number by the random-number generator 113 conforms to rules using a predetermined initial value and a prescribed random-number generation polynomial.

Figure 16:
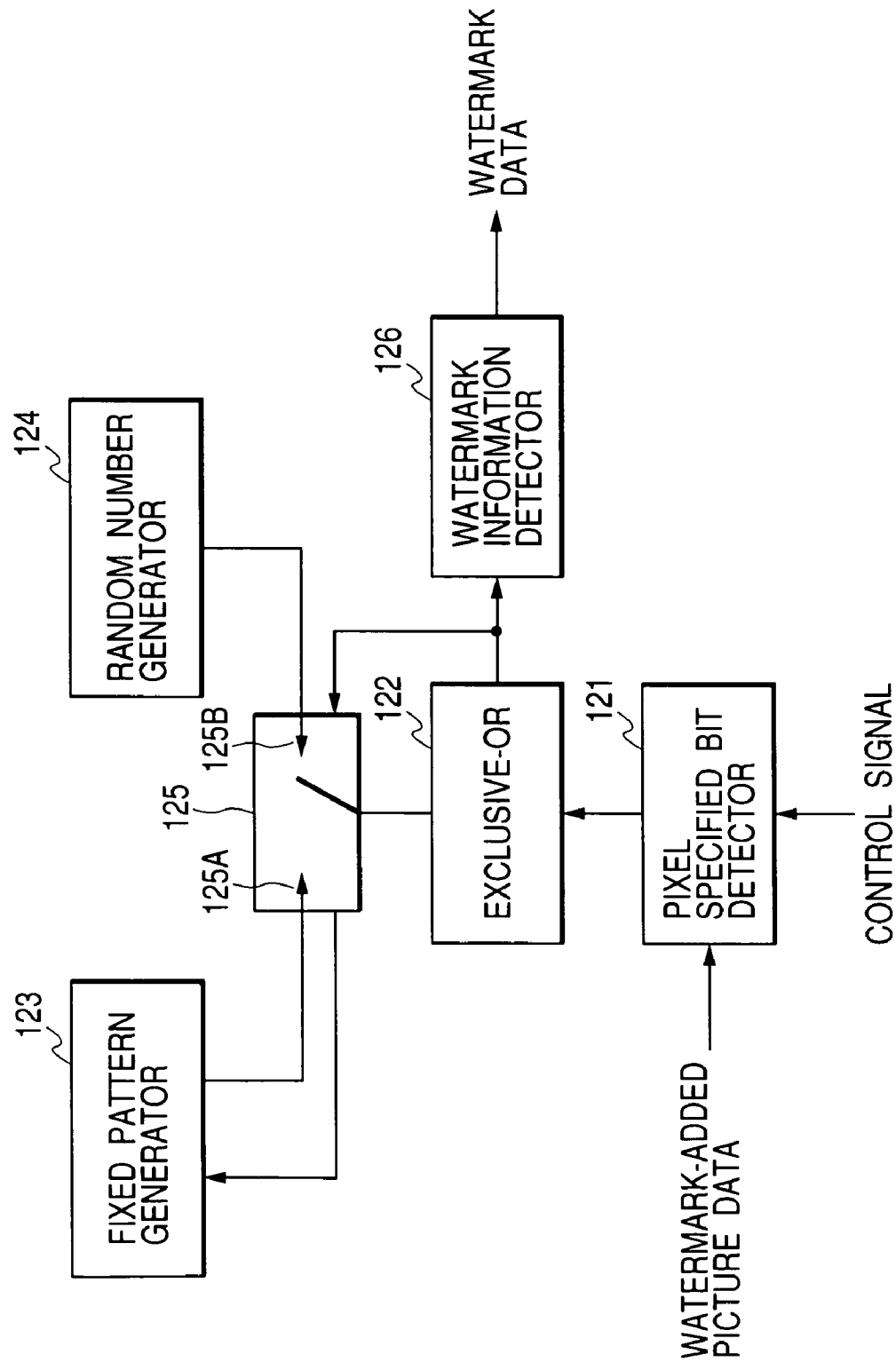
FIG. 16 is a block diagram of an apparatus for reproducing or extracting a watermark from watermarked contents data (watermark-added contents data) according to the second embodiment of this invention.

FIG. 16 shows an apparatus for reproducing or extracting a watermark from watermarked contents data (watermark-added contents data) according to the second embodiment of this invention. The apparatus of FIG. 16 includes a pixel specified-bit detector 121, an exclusive-OR device 122, a random-number generator 123, a fixed-pattern generator 124, a switch 125, and a watermark information detector 126. The pixel specified-bit detector 121 is connected to a first input terminal of the exclusive-OR device 122. The random-number generator 123 is connected to the switch 125. The fixed-pattern generator 124 is connected to the switch 125. The switch 125 is connected to a second input terminal of the exclusive-OR device 122. The output terminal of the exclusive-OR device 122 is connected to the switch 125 and the watermark information detector 126.

Watermark-added picture data (watermarked contents data) are fed to the pixel specified-bit detector 121. A suitable device (not shown) reproduces the watermark-added picture data from a recording medium, and feeds them to the pixel specified-bit detector 121. Originally, the watermark-added picture data are generated by the apparatus of FIG. 10. The watermark-added picture data are composed of a watermark-added luminance signal Y and color difference signals Cb and Cr. Each of the watermark-added luminance signal Y and the color difference signals Cb and Cr has 8 bits per pixel.

For every pixel represented by the luminance signal Y, the pixel specified-bit detector 121 determines the number "N" of lower bits starting from the lowest bit among 8 bits corresponding to the pixel in accordance with the strength (intensity) of the embedded watermark relative to the original picture. Here, "N" denotes a natural number smaller than 8. A fragment of the watermark is embedded in the determined N lower bits. The pixel specified-bit detector 121 receives a control signal representing the strength of the embedded watermark. The control signal is fed from a suitable device such as an input device which can be accessed by a user.

When the strength of the embedded watermark relative to the original picture is the smallest, the pixel specified-bit detector 121 sets the number N to 1 and therefore designates and selects only the lowest bit among 8 bits per luminance pixel as a bit in which a fragment of the watermark is embedded as shown in FIG. 3. When the strength of the embedded watermark relative to the original picture is the second smallest, the pixel specified-bit detector 121 sets the number N to 2 and therefore designates and selects only the two lower bits among 8 bits per luminance pixel as bits in which a fragment of the watermark is embedded as shown in FIG. 4. When the strength of the embedded watermark relative to the original picture is the third smallest, the pixel specified-bit detector 121 sets the number N to 3 and therefore designates and designates only the three lower bits among 8 bits per luminance pixel as bits in which a fragment of the watermark is embedded as shown in FIG. 5.

The pixel specified-bit detector 121 outputs the designated luminance pixel bits (the selected luminance pixel bits) to the exclusive-OR device 122. The exclusive-OR device 122 includes a calculator which computes a binary luminance pixel value from the designated luminance pixel bits. In the case where only the lowest bit is selected among 8 bits per luminance pixel as a bit in which a fragment of the watermark is embedded, the calculator sets a luminance pixel value to "0" for a designated luminance pixel bit of "0". The calculator sets a luminance pixel value to "1" for a designated luminance pixel bit of "1". In the case where only the two lower bits are selected among 8 bits per luminance pixel as bits in which a fragment of the water-mark is embedded, the calculator sets a luminance pixel value to "1" for two lower luminance pixel bits of "11" ("3" in decimal). The calculator sets a luminance pixel value to "0" for two lower luminance pixel bits different from "11".

In the case where only the three lower bits are selected among 8 bits per luminance pixel as bits in which a fragment of the watermark is embedded, the calculator sets a luminance pixel value to "1" for three lower luminance pixel bits of "111" ("7" in decimal). The calculator sets a luminance pixel value to "0" for three lower luminance pixel bits different from "111".

The fixed-pattern generator 124 includes a memory storing a given number of bits, for example, 8 bits, in a fixed pattern. The fixed-pattern generator 124 outputs the fixed-pattern bits to a terminal 125B of the switch 125. The fixed bit pattern produced by the fixed-pattern generator 124 is the same as that produced by the fixed-pattern generator 114 in the apparatus of FIG. 10. For example, the fixed bit pattern produced by the fixed-pattern generator 124 is "01100110" (see FIG. 12).

The random-number generator 123 produces data representing a number which varies at random. The random-number generator 123 outputs the random-number data to a terminal 125A of the switch 125. The structure of the random-number generator 123 is the same as that of the random-number generator 113 in the apparatus of FIG. 10. Thus, the random-number data produced by the random-number generator 123 are equal in value and time-domain change to those produced by the random-number generator 113.

The switch 125 selects either the fixed-pattern bits or the random-number data, and passes either the fixed-pattern bits or the random-number data to the exclusive-OR device 122. The switch 125 can be controlled by an output signal from the exclusive-OR device 122. Initially, the switch 125 assumes a position at which the fixed-pattern bits are transmitted from the fixed-pattern generator 124 to the exclusive-OR device 122.

When receiving the fixed-pattern bits from the switch 125, the exclusive-OR device 122 arranges the corresponding luminance pixel values (for example, the corresponding 8 successive luminance pixel values) in a raster scanning order and executes exclusive-OR operation between the fixed-pattern bits and the corresponding luminance pixel values on a bit-by-bit basis. The exclusive-OR device 122 outputs data representative of the results of exclusive-OR operation to the switch 125 and the watermark information detector 126. The exclusive-OR device 122 iterates these steps while the luminance pixel values are periodically replaced by new ones.

The switch 125 includes a memory storing 8 bits in a specified pattern. The specified bit pattern is the same as that used in the apparatus of FIG. 10. For example, the specified bit pattern is identical with that in FIG. 13. The switch 125 further includes a deciding section (a comparing section) responsive to the operation-result data outputted from the exclusive-OR device 122. For every 8 luminance pixels, the deciding section determines whether or not the bit pattern represented by the operation-result data is equal to the specified bit pattern. When the bit pattern represented by the operation-result data is equal to the specified bit pattern, the deciding section determines that the operation-resultant data correspond to a former portion "A" of a watermark-embedding block E (see FIG. 14). In this case, the deciding section starts the random-number generator 123, and the switch 125 selects the random-number data instead of the fixed-pattern bits. Thus, the switch 125 transmits the random-number data to the exclusive-OR device 122 instead of the fixed-pattern bits. In this way, when the in-frame position of an image fragment currently represented by the watermark-added picture data reaches a former portion "A" of every watermark-embedding block E (see FIG. 14), the random-number data are fed from the switch 125 to the exclusive-OR device 122 instead of the fixed-pattern bits.

When receiving the random-number data from the switch 125, the exclusive-OR device 122 executes exclusive-OR operation between the random-number data and the luminance pixel values on a bit-by-bit basis. The exclusive-OR device 122 outputs data representative of the results of exclusive-OR operation to the switch 125 and the watermark information detector 126. Immediately after the fixed-pattern bits are replaced by the random-number data, the operation-result data outputted from the exclusive-OR device 122 are reproduced watermark data assigned to the latter portion "B" of the present watermark-embedding block E (see FIG. 14). The reproduced watermark data have 1-byte segments assigned respectively to the sub-portions B1, B2, . . . , and Bn composing the latter portion "B" of the present watermark-embedding block E (see FIGS. 14 and 15). The switch 125 includes a counting section which starts when the fixed-pattern bits are replaced by the random-number data. The counting section counts every 1 byte of the operation-result data outputted from the exclusive-OR device 122 after the replacement of the fixed-pattern bits by the random-number data. When the count number reaches the predetermined number "n", the switch 125 resets and deactivates the random-number generator 123 and selects the fixed-pattern bits instead of the random-number data. Thus, the switch 125 transmits the fixed-pattern bits to the exclusive-OR device 122 instead of the random-number data.

The watermark information detector 126 extracts the watermark data (the watermark information) from the operation-result data outputted by the exclusive-OR device 122. For every watermark-embedding block E, the extracted watermark data have 1-byte segments assigned respectively to the sub-portions B1, B2, . . . , and Bn composing the latter portion "B" of the watermark-embedding block E. The watermark information detector 126 outputs the extracted watermark data as reproduced watermark data or detected watermark data on a byte-by-byte basis (an 8-bits-by-8-bits basis).

The watermark data indicate, for example, letters and characters of the ASCII code. The watermark data may be numerical value data.

The watermark information detector 126 may be followed by an information converter, a user interface, and a monitor. In this case, the watermark information is changed into corresponding character information by the information converter, and the character information is transmitted from the information converter to the monitor via the user interface before being visualized on the monitor.

The apparatus of FIG. 10 may transmit the watermark-added picture data to a communication network such as the Internet, a wire communication network, or a radio communication network.

The apparatus of FIG. 16 may receive the watermark-added picture data from a communication network such as the Internet, a wire communication network, or a radio communication network.

The apparatus of FIG. 10 may be formed by a computer system or a processor-based system programmed to execute the previously-indicated steps of operation. Similarly, the apparatus of FIG. 16 may be formed by a computer system or a processor-based system programmed to execute the previously-indicated steps of operation.

Third Embodiment

Figure 17:
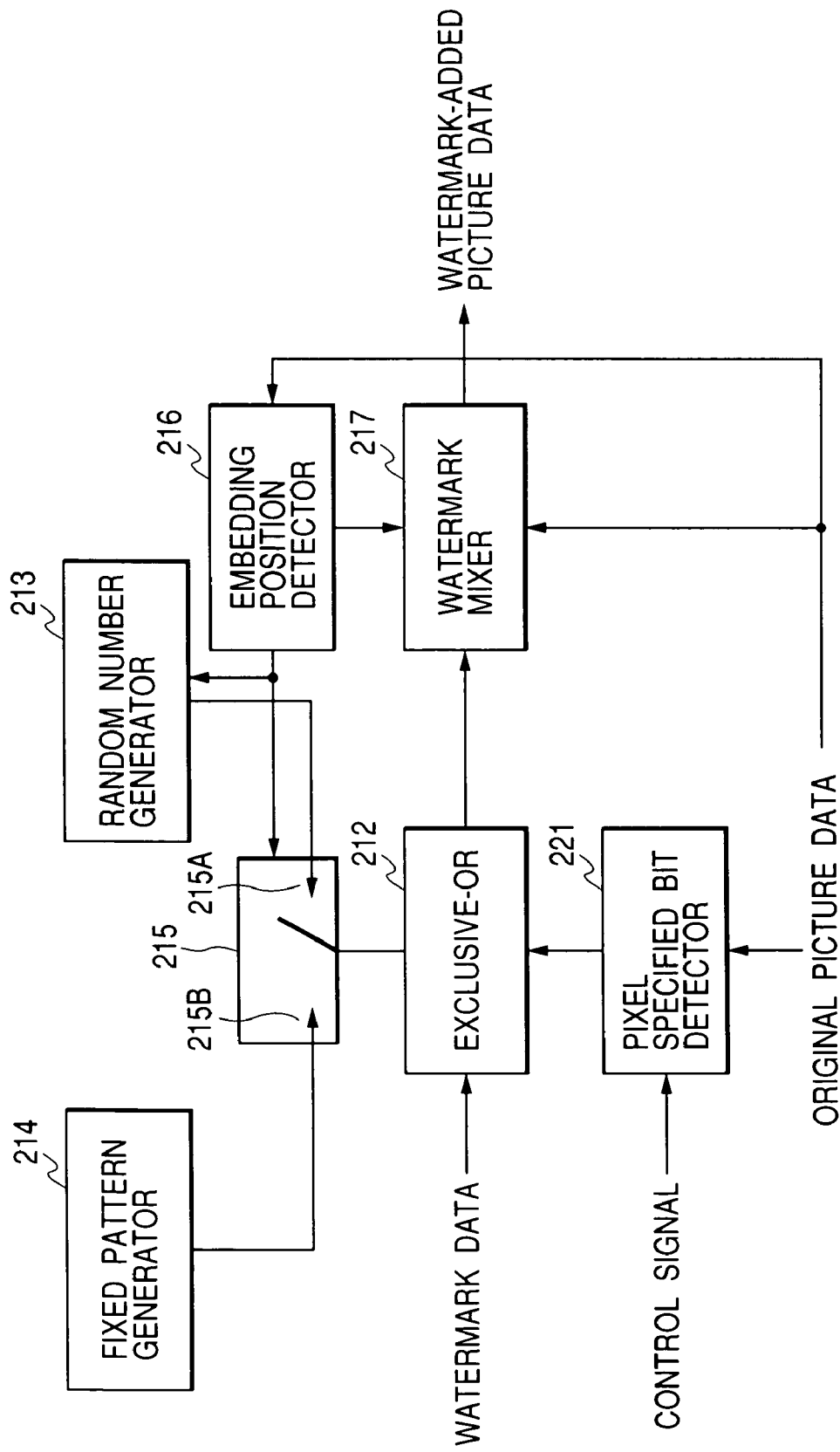
FIG. 17 is a block diagram of an apparatus for embedding or inserting a watermark into contents data according to a third embodiment of this invention.

FIG. 17 shows an apparatus for embedding or inserting a watermark into contents data according to a third embodiment of this invention. The apparatus of FIG. 17 includes a pixel specified-bit detector 211, an exclusive-OR device 212, a random-number generator 213, a fixed-pattern generator 214, a switch 215, an embedding-position detector (an embedding-position deciding device) 216, and a watermark mixer 217. The pixel specified-bit detector 211 is connected to the exclusive-OR device 212. The exclusive-OR device 212 is connected to the switch 215 and the watermark mixer 217. The random-number generator 213 is connected to the switch 215 and the embedding-position detector 216. The fixed-pattern generator 214 is connected to the switch 215. The embedding-position detector 216 is connected to the switch 215 and the watermark mixer 217.

Contents data representing an original picture or a sequence of original pictures are fed to the pixel specified-bit detector 211, the embedding-position detector 216, and the watermark mixer 217. The original picture data (the contents data) are composed of a luminance signal Y and color difference signals Cb and Cr.

As shown in FIG. 2, one picture (one frame) represented by the luminance signal Y has 720 pixels in a horizontal direction, and 480 lines in a vertical direction. One picture (one frame) represented by the color difference signal Cb has 360 pixels in the horizontal direction, and 480 lines in the vertical direction. Similarly, one picture (one frame) represented by the color difference signal Cr has 360 pixels in the horizontal direction, and 480 lines in the vertical direction. Each of the luminance signal Y and the color difference signals Cb and Cr has 8 bits per pixel.

The original picture data may be replaced by audio data having a sequence of digital signal samples each having a prescribed number of bits, for example, 16 bits. The level represented by a digital signal sample varies in time domain as shown in FIG. 11.

For every pixel represented by the luminance signal Y, the pixel specified-bit detector 21 1 determines the number "N" of lower bits starting from the lowest bit among 8 bits corresponding to the pixel in accordance with a desired strength (intensity) of an embedded watermark relative to an original picture. Here, "N" denotes a natural number smaller than 8. A fragment of a watermark can be embedded into the determined N lower bits. The pixel specified-bit detector 211 receives a control signal representing the desired strength of an embedded watermark. The control signal is fed from a suitable device such as an input device which can be accessed by a user.

When the desired strength of an embedded watermark relative to an original picture is the smallest, the pixel specified-bit detector 211 sets the number N to 1 and therefore designates and selects only the lowest bit among 8 bits per luminance pixel as a bit into which a watermark fragment can be embedded as shown in FIG. 3. When the desired strength of an embedded watermark relative to an original picture is the second smallest, the pixel specified-bit detector 211 sets the number N to 2 and therefore designates and selects only the two lower bits among 8 bits per luminance pixel as bits into which a watermark fragment can be embedded as shown in FIG. 4. When the desired strength of an embedded watermark relative to an original picture is the third smallest, the pixel specified-bit detector 211 sets the number N to 3 and therefore designates and designates only the three lower bits among 8 bits per luminance pixel as bits into which a watermark fragment can be embedded as shown in FIG. 5.

In this way, the number of N lower bits among 8 bits per luminance pixel into which a watermark fragment can be embedded is increased as the desired strength of the embedded watermark relative to an original picture is greater. In fact, the actual strength of an embedded watermark relative to an original picture rises in accordance with an increase in the number of N lower bits among 8 bits per luminance pixel into which a corresponding fragment of the watermark has been embedded. The original picture is less deteriorated as the strength of the embedded watermark decreases. In the case where watermark-added contents data are compressed at a high rate by an application program, the strength of the embedded watermark is preferably set to such a great value as to prevent the watermark from being erased by the compression. Thus, the strength of the embedded watermark is decided in accordance with the application program.

Watermark information (information representing a watermark) has one bit per interested pixel. Accordingly, the watermark information is "0" or "1" for every interested pixel. The watermark information is also referred to as the watermark data. In the case where only the lowest bit is selected among 8 bits per luminance pixel as a bit into which a watermark fragment can be embedded as shown in FIG. 3, a watermark information bit of "0" or "1" corresponds to a lowest luminance pixel bit of "0" or "1". In the case where only the two lower bits are selected among 8 bits per luminance pixel as bits into which a watermark fragment can be embedded as shown in FIG. 4, a watermark information bit of "0" or "1" corresponds to two lower luminance pixel bits of "00" ("0" in decimal) or "11" ("3" in decimal). In the case where only the three lower bits are selected among 8 bits per luminance pixel as bits into which a watermark fragment can be embedded as shown in FIG. 5, a watermark information bit of "0" or "1" corresponds to three lower luminance pixel bits of "000" ("0" in decimal) or "111" ("7" in decimal). As previously mentioned, the actual strength of an embedded watermark relative to an original picture rises in accordance with an increase in the number of N lower bits among 8 bits per luminance pixel into which a corresponding fragment of the watermark has been embedded.

The pixel specified-bit detector 211 outputs the designated luminance pixel bits (the selected luminance pixel bits) to the exclusive-OR device 212. The exclusive-OR device 212 includes a calculator which computes a binary luminance pixel value from the designated luminance pixel bits. In the case where only the lowest bit is selected among 8 bits per luminance pixel as a bit into which a watermark fragment can be embedded, the calculator sets a luminance pixel value to "0" for a designated luminance pixel bit of "0". The calculator sets a luminance pixel value to "1" for a designated luminance pixel bit of "1". In the case where only the two lower bits are selected among 8 bits per luminance pixel as bits into which a watermark fragment can be embedded, the calculator sets a luminance pixel value to "1" for two lower luminance pixel bits of "11" ("3" in decimal). The calculator sets a luminance pixel value to "0" for two lower luminance pixel bits different from "11". In the case where only the three lower bits are selected among 8 bits per luminance pixel as bits into which a watermark fragment can be embedded, the calculator sets a luminance pixel value to "1" for three lower luminance pixel bits of "111" ("7" in decimal). The calculator sets a luminance pixel value to "0" for three lower luminance pixel bits different from "111".

The fixed-pattern generator 214 produces, for example, 9 bits in a fixed pattern which correspond to 9 neighboring pixels being 3 luminance pixels in a horizontal direction by 3 luminance pixels in a vertical direction. Preferably, the fixed bit pattern remains unchanged when being rotated through 90, 180, or 270 degrees. An example of the fixed pattern of 9 bits (3 by 3 bits) is identical with that in FIG. 7. Preferably, the fixed-pattern generator 214 includes a memory storing the fixed-pattern bits. The fixed-pattern generator 214 outputs the fixed-pattern bits to a terminal 215B of the switch 215.

The random-number generator 213 produces data representing a number which varies at random. The random-number generator 213 outputs the random-number data to a terminal 215A of the switch 215.

The switch 215 selects either the fixed-pattern bits or the random-number data, and passes either the fixed-pattern bits or the random-number data to the exclusive-OR device 212 under control by the embedding-position detector 216.

The embedding-position detector 216 includes a memory storing prescribed address ranges (prescribed positions) into which a watermark will be embedded. The embedding-position detector 216 further includes a section (a comparing section) for deciding whether or not the address currently related to the original picture data reaches one of central areas of the watermark-embedding address ranges (the watermark-embedding positions). When the current address reaches one of the central areas of the watermark-embedding address ranges, the embedding-position detector 216 controls the switch 215 to select the fixed-pattern bits. Thus, the switch 215 transmits the fixed-pattern bits from the fixed-pattern generator 214 to the exclusive-OR device 212. Subsequently, the embedding-position detector 216 controls the switch 215 to select the random-number data instead of the fixed-pattern bits. Thus, the switch 215 transmits the random-number data from the random-number generator 213 to the exclusive-OR device 212. In this way, when the current address reaches one of the central areas of the watermark-embedding address ranges, a succession of the fixed-pattern bits and the random-number data is fed to the exclusive-OR device 212 from the switch 215.

The exclusive-OR device 212 includes a memory storing 9 bits in a specified pattern which correspond to 9 neighboring pixels being 3 luminance pixels in a horizontal direction by 3 luminance pixels in a vertical direction. An example of the specified pattern of 9 bits (3 by 3 bits) is identical with that in FIG. 8. The exclusive-OR device 212 also includes a section for processing, in response to the fixed-pattern bits, the luminance pixel values corresponding to each of the central areas of the watermark-embedding positions. Specifically, for each of the central areas of the watermark-embedding positions, the processing section of the exclusive-OR device 212 executes exclusive-OR operation between the fixed-pattern bits and the specified-pattern bits on a bit-by-bit basis. The processing section forcedly sets or equalizes the corresponding luminance pixel values to the result of the exclusive-OR operation, for example, "111111111". The exclusive-OR device 212 outputs data representative of the processing-resultant luminance pixel values to the watermark mixer 217. The exclusive-OR device 212 may notify the watermark mixer 217 of the exclusive-OR operation result and the addresses of the related luminance pixel values.

In other words, the processing section of the exclusive-OR device 212 calculates a 9-bit pattern which can be converted into the specified bit pattern (see FIG. 8) by exclusive-OR operation with the fixed bit pattern (see FIG. 7). The processing section forcedly sets or equalizes the corresponding luminance pixel values to the calculated 9-bit pattern. An example of the calculated 9-bit pattern is "111111111". The exclusive-OR device 212 outputs data representative of the processing-resultant luminance pixel values (that is, the calculated 9-bit pattern) to the watermark mixer 217.

Preferably, the exclusive-OR device 212 notifies the embedding-position detector 216 when the signal processing in response to the fixed-pattern bits is completed. In this case, when the signal processing by the exclusive-OR device 212 in response to the fixed-pattern bits is completed, the embedding-position detector 216 starts the random-number generator 213 and controls the switch 215 to select the random-number data instead of the fixed-pattern bits. Thus, the switch 215 transmits the random-number data to the exclusive-OR device 212 instead of the fixed-pattern bits.

The exclusive-OR device 212 receives watermark data (data representative of a watermark) from a suitable device such as a memory or an input device. The watermark data are also referred to as the watermark information. When receiving the random-number data from the switch 215, the exclusive-OR device 212 executes exclusive-OR operation between the random-number data and the watermark data on a bit-by-bit basis. The exclusive-OR device 212 outputs data representative of the results of exclusive-OR operation to the watermark mixer 217.

The embedding-position detector 216 notifies the watermark mixer 217 of the watermark-embedding address ranges. For each of the watermark-embedding address ranges, the watermark mixer 217 places the output data from the exclusive-OR device 212 in the luminance pixel bits of the original picture data which are designated and selected by the pixel specified-bit detector 211. In other words, the watermark mixer 217 replaces the contents of the designated luminance pixel bits (the selected luminance pixel bits) with the contents of the output data from the exclusive-OR device 212. Thus, the watermark mixer 217 rewrites or updates the designated luminance pixel bits into agreement with the output data from the exclusive-OR device 212. As a result, the calculated 9-bit pattern and the watermark data are embedded into each of portions of the original picture data which correspond to the watermark-embedding address ranges. The watermark mixer 217 outputs the updating-resultant designated luminance pixel bits. The watermark mixer 217 outputs other bits of the original picture data without changing them. Thus, the watermark mixer 217 outputs the other bits as they are. The updating-resultant designated luminance pixel bits and the other bits outputted from the watermark mixer 217 compose watermarked picture information, that is, watermark-added picture data. A known device (not shown) records the watermark-added picture data on a recording medium.

As previously mentioned, the embedding-position detector 216 stores prescribed address ranges (prescribed positions) into which a watermark will be embedded. The prescribed address ranges correspond to watermark-embedding blocks F which disperse in a frame as shown in FIG. 18.

The embedding-position detector 216 may be modified as follows. A first modification of the embedding-position detector 216 generates address ranges in response to the original picture data, and uses the generated address ranges instead of the prescribed address ranges. Regarding an image represented by the original picture data, the first modification of the embedding-position detector 216 calculates the degree of the complexity of each of 8-by-8-pixel image portions. The first modification of the embedding-position detector 216 compares the calculated complexity degree with a prescribed value. The first modification of the embedding-position detector 216 generates address ranges in accordance with the positions of 8-by-8-pixel image portions having calculated complexity degrees equal to or greater than the prescribed value. The use of highly complex image portions as watermark-embedding blocks reduces a visually-sensible deterioration in image quality which is caused by watermarking. A second modification of the embedding-position detector 216 generates address ranges in response to the original picture data, and uses the generated address ranges instead of the prescribed address ranges. Regarding an image represented by the original picture data, the second modification of the embedding-position detector 216 detects the contours of separate and distinct image portions. The second modification of the embedding-position detector 216 generates address ranges in accordance with the detected contours. The use of contours as watermark-embedding blocks enables a watermark to remain at a higher possibility even when signal processing to cut out a portion from a watermark-added image is carried out.

As previously mentioned, the embedding-position detector 216 decides whether or not the address currently related to the original picture data reaches one of the central areas of the watermark-embedding address ranges (the watermark-embedding positions). When the current address reaches one of the central areas of the watermark-embedding address ranges, the embedding-position detector 216 controls the switch 215 to select the fixed-pattern bits. Thus, the switch 215 transmits the fixed-pattern bits to the exclusive-OR device 212. As previously mentioned, the exclusive-OR device 212 processes the corresponding luminance pixel values in response to the fixed-pattern bits. When the signal processing by the exclusive-OR device 212 in response to the fixed-pattern bits is completed, the embedding-position detector 216 starts the random-number generator 213 and controls the switch 215 to select the random-number data instead of the fixed-pattern bits. Thus, the switch 215 transmits the random-number data to the exclusive-OR device 212 instead of the fixed-pattern bits. In this way, when the current address reaches one of the central areas of the watermark-embedding address ranges, a succession of the fixed-pattern bits and the random-number data is fed to the exclusive-OR device 212 from the switch 215.

Figure 18:
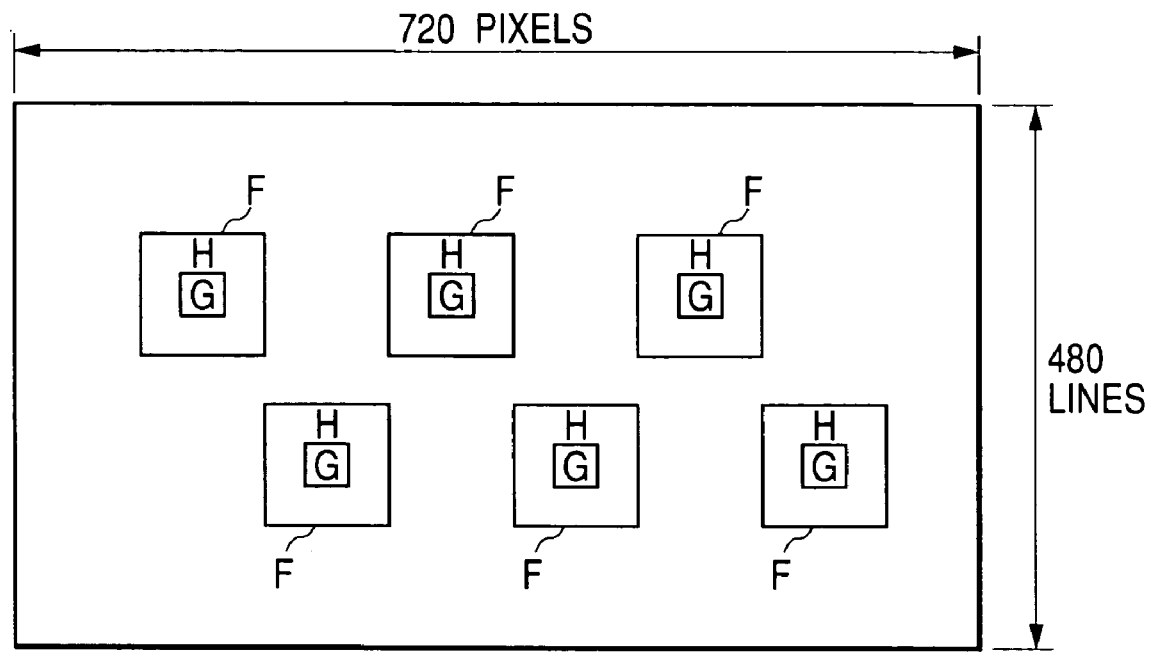
FIG. 18 is a diagram of a frame in which watermark-embedding blocks disperse.

As shown in FIG. 18, each of the watermark-embedding blocks F is divided into a central portion G and an outer portion H. The central portion G is surrounded by the outer portion H. The central portion G of each watermark-embedding block F corresponds to the central area of each watermark-embedding address range. The calculated 9-bit pattern is assigned to each of the central portions G of the watermark-embedding blocks F. On the other hand, the results of exclusive-OR operation between the random-number data and the watermark data are assigned to the outer portions H of the watermark-embedding blocks F.

In more detail, the watermark mixer 217 includes a memory for temporarily storing the original picture data converted into the watermark-added picture data. The embedding-position detector 216 notifies the watermark mixer 217 of the watermark-embedding address ranges. Access can be given to segments of the original picture data in the memory which correspond to the central portion G and the outer portion H of each watermark-embedding block F. According to the memory accessing procedure in response to the watermark-embedding address ranges, for each of the central portions G of the watermark-embedding blocks F, the calculated 9bit pattern is placed and embedded in the luminance pixel bits of the original picture data which are designated and selected by the pixel specified-bit detector 211. For the outer portions H of the watermark-embedding blocks F, the results of exclusive-OR operation between the random-number data and the watermark data are placed and embedded in the luminance pixel bits of the original picture data which are designated and selected by the pixel specified-bit detector 211. For the watermark-embedding blocks F, other luminance pixel bits of the original picture data are held unchanged. Also, for in-frame areas outside the watermark-embedding blocks F, the original picture data are held unchanged. Accordingly, for the in-frame areas outside the watermark-embedding blocks F, the watermark mixer 217 passes the original picture data as they are.

Figure 19:
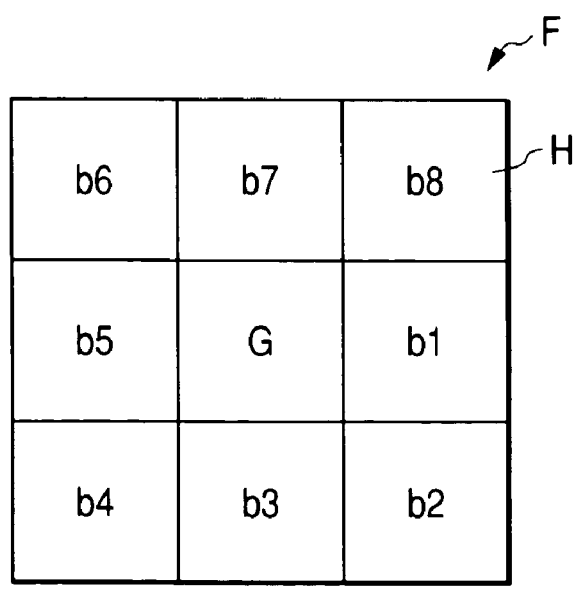
FIG. 19 is a diagram of the details of a watermark-embedding block in FIG. 18.

Preferably, the watermark data have a predetermined number "n" of bytes, for example, 8 bytes. In this case, as shown in FIG. 19, the outer portion H of each watermark-embedding block F is divided into 1-byte sub-portions b1, b2, . . . , and bn located outward of the central portion G thereof. First, second, . . . , and n-th bytes of the results of exclusive-OR operation between the random-number data and the watermark data are placed in the watermark-embedding-block sub-portions b1, b2, . . . , and bn, respectively.

Figure 20:
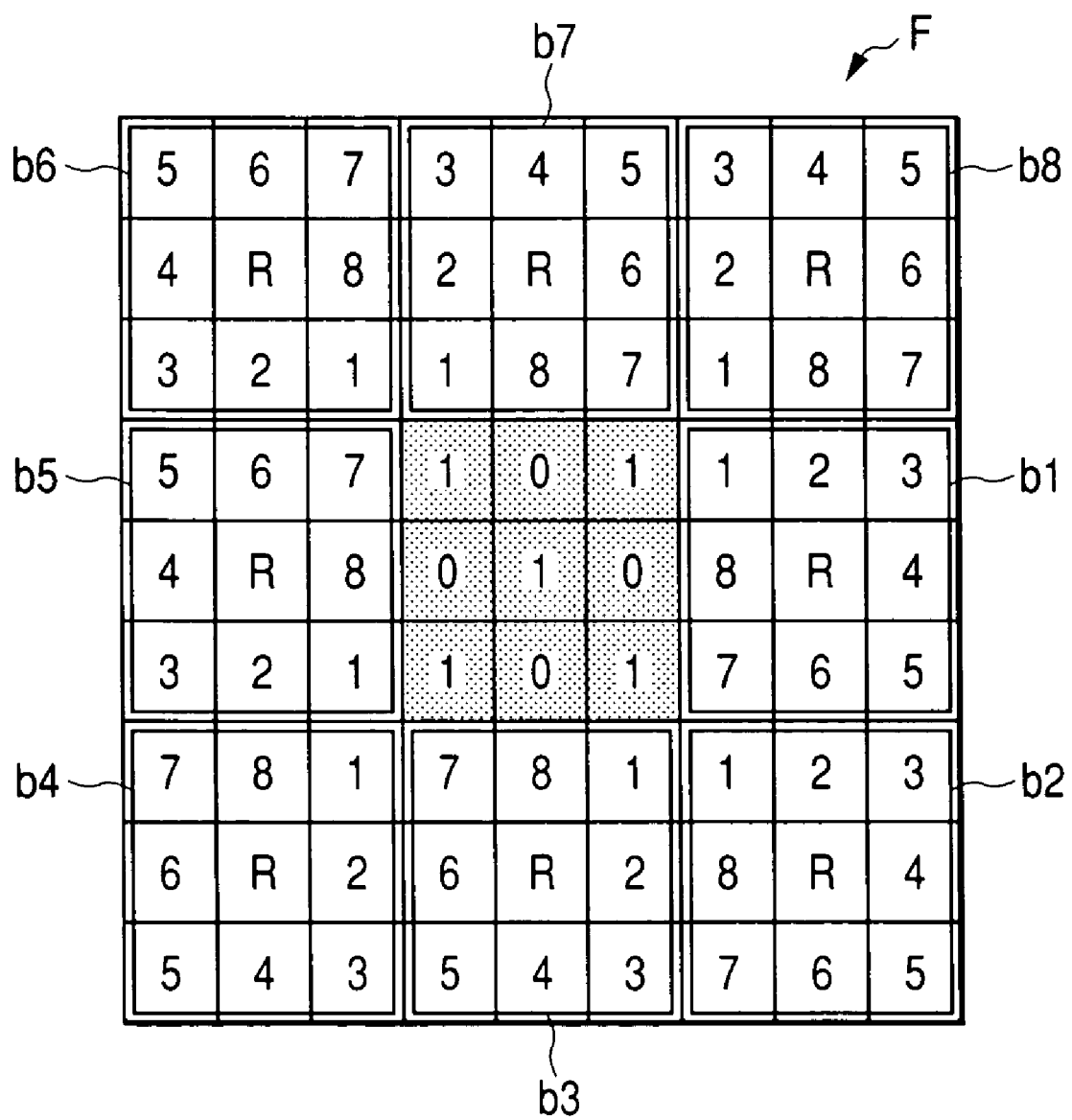
FIG. 20 is a diagram of the details of the watermark-embedding block in FIG. 19.

As shown in FIG. 20, each of the watermark-embedding-block sub-portions b1, b2, . . . , and bn has 3-by-3-bit array except a central-position bit R. The central-position bit R can be used as a reserved bit. For each of the watermark-embedding-block sub-portions b1, b2, . . . , and bn, 8 bits of the exclusive-OR operation result are sequentially placed in the bit positions of the 3-by-3-bit array in the order denoted by the numerals in FIG. 20. Preferably, the resultant bit placement pattern remains unchanged when being rotated through 90, 180, or 270 degrees.

Preferably, the generation of the random number by the random-number generator 213 conforms to rules using a predetermined initial value and a prescribed random-number generation polynomial.

Figure 21:
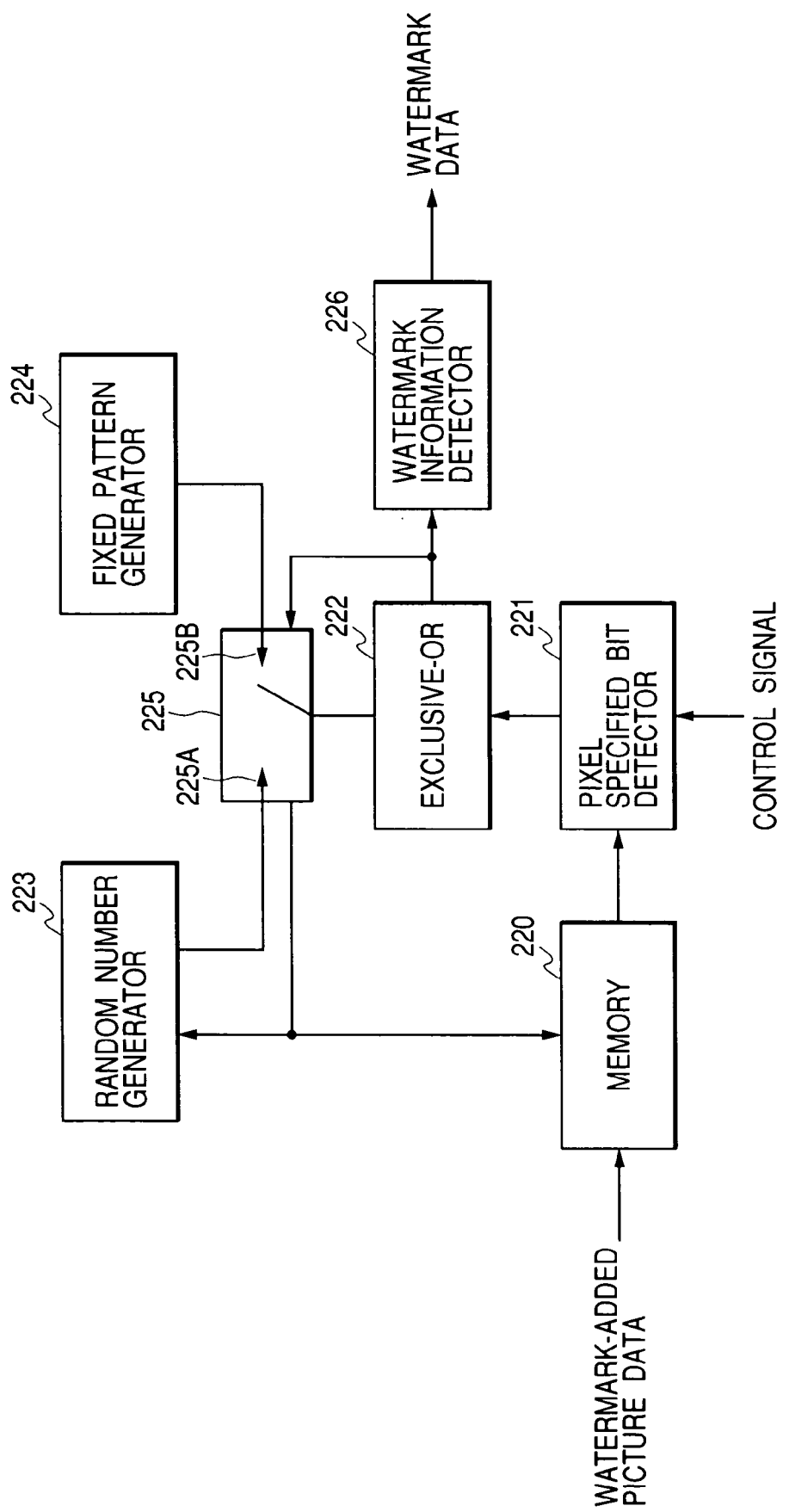
FIG. 21 is a block diagram of an apparatus for reproducing or extracting a watermark from watermarked contents data (watermark-added contents data) according to the third embodiment of this invention.

FIG. 21 shows an apparatus for reproducing or extracting a watermark from watermarked contents data (watermark-added contents data) according to the third embodiment of this invention. The apparatus of FIG. 21 includes a memory device 220, a pixel specified-bit detector 221, an exclusive-OR device 222, a random-number generator 223, a fixed-pattern generator 224, a switch 225, and a watermark information detector 226. The memory device 220 is connected to the pixel specified-bit detector 221 and the switch 225. The pixel specified-bit detector 221 is connected to a first input terminal of the exclusive-OR device 222. The random-number generator 223 is connected to the switch 225. The fixed-pattern generator 224 is connected to the switch 225. The switch 225 is connected to a second input terminal of the exclusive-OR device 222. The output terminal of the exclusive-OR device 222 is connected to the switch 225 and the watermark information detector 226.

Watermark-added picture data (watermarked contents data) are fed to the memory device 220. A suitable device (not shown) reproduces the watermark-added picture data from a recording medium, and feeds them to the memory device 220. Originally, the watermark-added picture data are generated by the apparatus of FIG. 17. The memory device 220 has a memory capacity corresponding to, for example, one frame. The watermark-added picture data are written into the memory device 220, being read out therefrom and being transferred to the pixel specified detector 221.

The memory device 220 includes a frame memory, and a write/read control circuit for writing and reading the watermark-added picture data into and from the frame memory.

The write/read control circuit responds to a control signal fed from the switch 225. Specifically, the write/read control circuit reads out segments of the watermark-added picture data from addresses in the frame memory which are designated by the control signal. In an initial condition or in the absence of the control signal, the watermark-added picture data are sequentially read out from the frame memory in an order equal to the data write order. Also, after the read-out of segments of the watermark-added picture data from designated addresses in the frame memory has been completed, the watermark-added picture data are sequentially read out from the frame memory in an order equal to the data write order.

The watermark-added picture data are composed of a watermark-added luminance signal Y and color difference signals Cb and Cr. Each of the watermark-added luminance signal Y and the color difference signals Cb and Cr has 8 bits per pixel.

For every pixel represented by the luminance signal Y, the pixel specified-bit detector 221 determines the number "N" of lower bits starting from the lowest bit among 8 bits corresponding to the pixel in accordance with the strength (intensity) of the embedded watermark relative to the original picture. Here, "N" denotes a natural number smaller than 8. A fragment of the watermark is embedded in the determined N lower bits. The pixel specified-bit detector 221 receives a control signal representing the strength of the embedded watermark. The control signal is fed from a suitable device such as an input device which can be accessed by a user. Preferably, information about the number N is previously known to the pixel specified-bit detector 221.

When the strength of the embedded watermark relative to the original picture is the smallest, the pixel specified-bit detector 221 sets the number N to 1 and therefore designates and selects only the lowest bit among 8 bits per luminance pixel as a bit in which a fragment of the watermark is embedded as shown in FIG. 3. When the strength of the embedded watermark relative to the original picture is the second smallest, the pixel specified-bit detector 221 sets the number N to 2 and therefore designates and selects only the two lower bits among 8 bits per luminance pixel as bits in which a fragment of the watermark is embedded as shown in FIG. 4. When the strength of the embedded watermark relative to the original picture is the third smallest, the pixel specified-bit detector 221 sets the number N to 3 and therefore designates and designates only the three lower bits among 8 bits per luminance pixel as bits in which a fragment of the watermark is embedded as shown in FIG. 5.

The pixel specified-bit detector 221 outputs the designated luminance pixel bits (the selected luminance pixel bits) to the exclusive-OR device 222. The exclusive-OR device 222 includes a calculator which computes a binary luminance pixel value from the designated luminance pixel bits. In the case where only the lowest bit is selected among 8 bits per luminance pixel as a bit in which a fragment of the watermark is embedded, the calculator sets a luminance pixel value to "0" for a designated luminance pixel bit of "0". The calculator sets a luminance pixel value to "1" for a designated luminance pixel bit of "1". In the case where only the two lower bits are selected among 8 bits per luminance pixel as bits in which a fragment of the watermark is embedded, the calculator sets a luminance pixel value to "1" for two lower luminance pixel bits of "11" ("3" in decimal). The calculator sets a luminance pixel value to "0" for two lower luminance pixel bits different from "11". In the case where only the three lower bits are selected among 8 bits per luminance pixel as bits in which a fragment of the watermark is embedded, the calculator sets a luminance pixel value to "1" for three lower luminance pixel bits of "111" ("7" in decimal). The calculator sets a luminance pixel value to "0" for three lower luminance pixel bits different from "111".

The fixed-pattern generator 224 includes a memory storing bits in a fixed pattern. The number of the fixed-pattern bits is equal to, for example, 9. The fixed bit pattern corresponds to, for example, 9 neighboring pixels being 3 luminance pixels in a horizontal direction by 3 luminance pixels in a vertical direction. The fixed bit pattern produced by the fixed-pattern generator 224 is the same as that produced by the fixed-pattern generator 214 in the apparatus of FIG. 17. For example, the fixed bit pattern produced by the fixed-pattern generator 224 is identical with that in FIG. 7. The fixed-pattern generator 224 outputs the fixed-pattern bits to a terminal 225B of the switch 225.

The random-number generator 223 produces data representing a number which varies at random. The random-number generator 223 outputs the random-number data to a terminal 225A of the switch 225. The structure of the random-number generator 223 is the same as that of the random-number generator 213 in the apparatus of FIG. 17. Thus, the random-number data produced by the random-number generator 223 are equal in value and time-domain change to those produced by the random-number generator 213.

The switch 225 selects either the fixed-pattern bits or the random-number data, and passes either the fixed-pattern bits or the random-number data to the exclusive-OR device 222. The switch 225 can be controlled by an output signal from the exclusive-OR device 222. Initially, the switch 225 assumes a position at which the fixed-pattern bits are transmitted from the fixed-pattern generator 224 to the exclusive-OR device 222.

For every 3 by 3 neighboring luminance pixels, the device 222 executes exclusive-OR operation between the luminance pixel values and the fixed-pattern bits on a bit-by-bit basis. The exclusive-OR device 222 outputs data representative of the results of exclusive-OR operation to the switch 225 and the watermark information detector 226. The exclusive-OR device 222 iterates these steps while the luminance pixel values are periodically replaced by new ones.

The switch 225 includes a memory storing 9 bits in a specified pattern. The specified bit pattern is the same as that used in the apparatus of FIG. 17. For example, the specified bit pattern is identical with that in FIG. 8. The switch 225 further includes a deciding section responsive to the operation-result data outputted from the exclusive-OR device 222. For every 3-by-3 neighboring luminance pixels, the deciding section determines whether or not the bit pattern represented by the operation-result data is equal to the specified bit pattern. When the bit pattern represented by the operation-result data is equal to the specified bit pattern, the deciding section determines that the operation-resultant data correspond to a central portion G of a watermark-embedding block F (see FIG. 18). In this case, the deciding section starts the random-number generator 223, and the switch 225 selects the random-number data instead of the fixed-pattern bits. Thus, the switch 225 transmits the random-number data to the exclusive-OR device 222 instead of the fixed-pattern bits. In this way, immediately after the in-frame position of an image fragment represented by the watermark-added picture data currently read out from the memory device 220 reaches a central portion G of every watermark-embedding block F (see FIG. 18), the random-number data are fed from the switch 225 to the exclusive-OR device 222 instead of the fixed-pattern bits. At the same time, the deciding section in the switch 225 outputs a control signal to the memory device 220 so that segments of the watermark-added picture data which correspond to the sub-portions b1, b2, . . . , and bn composing the outer portion H of the present watermark-embedding block F are sequentially read out from the memory device 220 and are sequentially fed to the pixel specified-bit detector 221. As a result, the designated luminance pixel bits (the selected luminance pixel bits) outputted from the pixel specified-bit detector 221 to the exclusive-OR device 222 become corresponding to the watermark-embedding block sub-portions b1, b2, . . . , and bn composing the outer portion H. Also, the luminance pixel values generated in the exclusive-OR device 222 become corresponding to the watermark-embedding block sub-portions b1, b2, . . . , and bn. Accordingly, the luminance pixel values become corresponding to the watermark-embedding block sub-portions b1, b2, . . . , and bn in synchronism with the transmission of the random-number data to the exclusive-OR device 222.

When receiving the random-number data from the switch 225, the exclusive-OR device 222 executes exclusive-OR operation between the random-number data and the luminance pixel values on a bit-by-bit basis. The exclusive-OR device 222 outputs data representative of the results of exclusive-OR operation to the switch 225 and the watermark information detector 226. Immediately after the fixed-pattern bits are replaced by the random-number data, the operation-result data outputted from the exclusive-OR device 222 are reproduced watermark data assigned to the outer portion H of the present watermark-embedding block F (see FIG. 18). The reproduced watermark data have 1-byte segments assigned respectively to the sub-portions b1, b2, . . . , and bn composing the outer portion H of the present watermark-embedding block F (see FIGS. 18 and 19). The switch 225 includes a counting section which starts when the fixed-pattern bits are replaced by the random-number data. The counting section counts every 1 byte of the operation-result data outputted from the exclusive-OR device 222 after the replacement of the fixed-pattern bits by the random-number data. When the count number reaches the predetermined number "n", the switch 225 resets and deactivates the random-number generator 223 and selects the fixed-pattern bits instead of the random-number data. At the same time, the switch 225 halts the feed of the control signal to the memory device 220. Thus, the switch 225 transmits the fixed-pattern bits to the exclusive-OR device 122 instead of the random-number data. Since the feed of the control signal to the memory device 220 is halted, the watermark-added picture data are sequentially read out therefrom before being applied to the pixel specified-bit detector 221.

The watermark information detector 226 extracts the watermark data (the watermark information) from the operation-result data outputted by the exclusive-OR device 222. For every watermark-embedding block F, the extracted watermark data have 1-byte segments assigned respectively to the sub-portions b1, b2, . . . , and bn composing the outer portion H of the watermark-embedding block F. The watermark information detector 226 outputs the extracted watermark data as reproduced watermark data or detected watermark data on a byte-by-byte basis (an 8-bits-by-8-bits basis).

The watermark data indicate, for example, letters and characters of the ASCII code. The watermark data may be numerical value data.

The watermark information detector 226 may be followed by an information converter, a user interface, and a monitor. In this case, the watermark information is changed into corresponding character information by the information converter, and the character information is transmitted from the information converter to the monitor via the user interface before being visualized on the monitor.

The apparatus of FIG. 17 may transmit the watermark-added picture data to a communication network such as the Internet, a wire communication network, or a radio communication network.

The apparatus of FIG. 21 may receive the watermark-added picture data from a communication network such as the Internet, a wire communication network, or a radio communication network.

In each of the watermark-embedding blocks F, the outer portion H may be modified to partially surround the central portion G under the condition that the portions H and G are in a given address relation (a given positional relation).

The calculated 9-bit pattern and the watermark information may be embedded into the N lower bits among 8 bits per color-difference pixel rather than the N lower bits among 8 bits per luminance pixel.

The apparatus of FIG. 17 may be formed by a computer system or a processor-based system programmed to execute the previously-indicated steps of operation. Similarly, the apparatus of FIG. 21 may be formed by a computer system or a processor-based system programmed to execute the previously-indicated steps of operation.

What is claimed is:

1. An apparatus for embedding a watermark into original picture data, comprising:

pattern generating means for generating a fixed two-dimensional bit pattern which remains unchanged when being rotated through one of 90, 180, and 270 degrees;

embedding-position deciding means for deciding a two-dimensional watermark-embedding region with respect to the original picture data;

random-number generating means for generating random-number data representing a random number;

data-storing and calculating means for storing pattern data representing a specified two-dimensional bit pattern which remains unchanged when being rotated through one of 90, 180, and 270 degrees, and for performing given logical operation between the fixed two-dimensional bit pattern and the specified two-dimensional bit pattern to calculate a desired two-dimensional bit pattern for specified bits, the specified bits being among bits in a first portion of the original picture data which corresponds to a first part of the two-dimensional watermark-embedding region;

operation means for executing the given logical operation between watermark data and the random-number data; and mixing means for changing the specified bits to represent the desired two-dimensional bit pattern, and for embedding a result of the given logical operation executed by the operation means in a second portion of the original picture data which corresponds to a second part of the two-dimensional watermark-embedding region different from the first part thereof;

wherein the fixed two-dimensional bit pattern has a square matrix array of bits with a same number of vertical-line bits and horizontal-line bits, and the specified two-dimensional bit pattern has a square matrix array of bits and is equal in size to the fixed two-dimensional bit pattern, the fixed two-dimensional bit pattern being a first "0" and "1" checkered bit pattern, the specified two-dimensional bit pattern being a second "0" and "1" checkered bit pattern different from the first "0" and "1" checkered bit pattern.

2. A method of embedding a watermark into original picture data, comprising the steps of:
generating a fixed two-dimensional bit pattern which remains unchanged when being rotated through one of 90, 180, and 270 degrees;
deciding a two-dimensional watermark-embedding region with respect to the original picture data;
generating random-number data representing a random number;
storing pattern data representing a specified two-dimensional bit pattern which remains unchanged when being rotated through one of 90, 180, and 270 degrees;
performing given logical operation between the fixed two-dimensional bit pattern and the specified two-dimensional bit pattern to calculate a desired two-dimensional bit pattern for specified bits, the specified bits being among bits in a first portion of the original picture data which corresponds to a first part of the two-dimensional watermark-embedding region;
executing the given logical operation between watermark data and the random-number data; and
changing the specified bits to represent the desired two-dimensional bit pattern, and embedding a result of the executed given logical operation in a second portion of the original picture data which corresponds to a second part of the two-dimensional watermark-embedding region different from the first part thereof;
wherein the fixed two-dimensional bit pattern has a square matrix array of bits with a same number of vertical-line bits and horizontal-line bits, and the specified two-dimensional bit pattern has a square matrix array of bits and is equal in size to the fixed two-dimensional bit pattern, the fixed two-dimensional bit pattern being a first "0" and "1" checkered bit pattern, the specified two-dimensional bit pattern being a second "0" and "1" checkered bit pattern different from the first "0" and "1" checkered bit pattern.

3. An apparatus for embedding a watermark into original picture data, comprising:
map data storing means for storing map data indicating a watermark embedded position, where the watermark should be embedded, with respect to a frame represented by the original picture data;
pattern generating means for generating bits representing a predetermined bit pattern in response to the map data, the predetermined bit pattern corresponding to the watermark and being in a position coincident with the watermark embedded position indicated by the map data, the predetermined bit pattern being a first two-dimensional bit pattern having a square matrix array of bits with a same number of vertical-line bits and horizontal-line bits, the predetermined bit pattern remaining unchanged when being rotated through one of 90, 180, and 270 degrees;
specified-bit detecting means for detecting bits in the original picture data as specified bits into which the watermark can be embedded;
data-storing and calculating means for storing pattern data representing a specified bit pattern being a second two-dimensional bit pattern having a square matrix array of bits and equal in size to the first two-dimensional bit pattern, the specified bit pattern remaining unchanged when being rotated through one of 90, 180, and 270 degrees, the data-storing and calculating means being further for performing given logical operation between the predetermined bit pattern and the specified bit pattern to calculate a desired bit pattern for the specified bits, wherein the desired bit pattern can be converted into the specified bit pattern by the given logical operation with the predetermined bit pattern in a decoder side; and
mixing means for changing the specified bits to represent the desired bit pattern to convert the original picture data into watermark-embedded picture data.

4. An apparatus as recited in claim 3, wherein the first two-dimensional bit pattern is a first "0" and "1" checkered bit pattern, and the second two-dimensional bit pattern is a second "0" and "1" checkered bit pattern different from the first "0" and "1" checkered bit pattern.

5. An apparatus as recited in claim 4, wherein the desired bit pattern is formed by bits of "1" only.

6. A method of embedding a watermark into original picture data, comprising the steps of:
generating map data indicating a watermark embedded position, where the watermark should be embedded, with respect to a frame represented by the original picture data;
generating bits representing a predetermined bit pattern in response to the map data, the predetermined bit pattern corresponding to the watermark and being in a position coincident with the watermark embedded position indicated by the map data, the predetermined bit pattern being a first two-dimensional bit pattern having a square matrix array of bits with a same number of vertical-line bits and horizontal-line bits, the predetermined bit pattern remaining unchanged when being rotated through one of 90, 180, and 270 degrees;
detecting bits in the original picture data as specified bits into which the watermark can be embedded;
generating pattern data representing a specified bit pattern being a second two-dimensional bit pattern having a square matrix array of bits and equal in size to the first two-dimensional bit pattern, the specified bit pattern remaining unchanged when being rotated through one of 90, 180, and 270 degrees;
performing given logical operation between the predetermined bit pattern and the specified bit pattern to calculate a desired bit pattern for the specified bits, wherein the desired bit pattern can be converted into the specified bit pattern by the given logical operation with the predetermined bit pattern in a decoder side; and
changing the specified bits to represent the desired bit pattern to convert the original picture data into watermark-embedded picture data.

7. A method as recited in claim 6, wherein the first two-dimensional bit pattern is a first "0" and "1" checkered bit pattern, and the second two-dimensional bit pattern is a second "0" and "1" checkered bit pattern different from the first "0" and "1" checkered bit pattern.

8. A method as recited in claim 7, wherein the desired bit pattern is formed by bits of "1" only.

* * * * *